(12) United States Patent
Ueki

(10) Patent No.: US 9,926,997 B2
(45) Date of Patent: Mar. 27, 2018

(54) VIBRATION-DAMPING DEVICE

(71) Applicant: BRIDGESTONE CORPORATION, Tokyo (JP)

(72) Inventor: Akira Ueki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/301,748

(22) PCT Filed: Apr. 3, 2015

(86) PCT No.: PCT/JP2015/060594
§ 371 (c)(1),
(2) Date: Oct. 4, 2016

(87) PCT Pub. No.: WO2015/156223
PCT Pub. Date: Oct. 15, 2015

(65) Prior Publication Data
US 2017/0023089 A1  Jan. 26, 2017

(30) Foreign Application Priority Data
Apr. 9, 2014 (JP) .................. 2014-080358

(51) Int. Cl.
*F16F 13/10* (2006.01)
*B60K 5/12* (2006.01)

(52) U.S. Cl.
CPC .......... *F16F 13/107* (2013.01); *B60K 5/1208* (2013.01); *F16F 13/10* (2013.01); *F16F 13/105* (2013.01)

(58) Field of Classification Search
CPC ............................ F16F 13/105; F16F 13/107
(Continued)

(56) References Cited

U.S. PATENT DOCUMENTS 4,483,521 A * 11/1984 Kakimoto ............. F16F 13/107
267/140.13
4,739,962 A * 4/1988 Morita ...................... F16F 9/34
267/140.13
(Continued)

FOREIGN PATENT DOCUMENTS

CN       101603576 A    12/2009
EP       0523896 A1     1/1993
(Continued)

OTHER PUBLICATIONS

Communication received on May 2, 2017 from the European Patent Office in counterpart application No. 15776546.2.
(Continued)

*Primary Examiner* — Christopher P Schwartz
(74) *Attorney, Agent, or Firm* — Sughrue Mion, PLLC

(57) ABSTRACT

The present invention is a vibration-damping device (10, 60, 80) which is provided with: a first attachment member (11) joined to one of a vibration generating unit and a vibration receiving unit and a second attachment member (12) joined to an other thereof; an elastic body which joins the first attachment member (11) to the second attachment member (12); a partition member (16, 90) which partitions a liquid chamber in the first attachment member (11) into a first liquid chamber (14) and a second liquid chamber (15), and in which at least one of the first liquid chamber (14) and the second liquid chamber (15) has the elastic body (13) as a portion of a wall surface thereof. The partition member (16, 90) is provided with a communicating passage (30), and the communicating path (30) is provided with a branching section (33) and a confluence section (32, 70, 84, 101).

11 Claims, 16 Drawing Sheets

(58) Field of Classification Search
USPC .................. 267/140.11–140.15, 140.2–140.5,
267/141.1–141.7
See application file for complete search history.

(56) References Cited

U.S. PATENT DOCUMENTS

| | | | |
|---|---|---|---|
| 4,817,925 A | | 4/1989 | Sprang et al. |
| 4,896,867 A | * | 1/1990 | Schyboll ............... F16F 13/107 |
| | | | 138/30 |
| 4,903,951 A | * | 2/1990 | Miyamoto ............ F16F 13/105 |
| | | | 267/140.13 |
| 4,909,490 A | * | 3/1990 | de Fontenay ......... F16F 13/262 |
| | | | 138/30 |
| 5,029,824 A | | 7/1991 | LaBeau et al. |
| 5,112,032 A | * | 5/1992 | Klein .................... F16F 13/105 |
| | | | 180/312 |
| 5,295,672 A | * | 3/1994 | Gugsch ................. F16F 13/105 |
| | | | 267/140.11 |
| 2009/0309279 A1 | | 12/2009 | Kim et al. |
| 2014/0232049 A1 | | 8/2014 | Kanaya |

FOREIGN PATENT DOCUMENTS

| | | |
|---|---|---|
| EP | 2420697 A1 | 2/2012 |
| JP | 57179448 A | 11/1982 |
| JP | 5818143 U | 2/1983 |
| JP | 60184737 A | 9/1985 |
| JP | 61-156749 U1 | 9/1986 |
| JP | 61-156750 U1 | 9/1986 |
| JP | 2007-120598 A | 5/2007 |
| JP | 2009-150451 A | 7/2009 |
| JP | 2011-241928 A | 12/2011 |
| JP | 2012-026510 A | 2/2012 |
| WO | 2013/114476 A1 | 8/2013 |

OTHER PUBLICATIONS

Communication dated Apr. 27, 2017, from the State Intellectual Property Office of People's Republic of China in counterpart Application No. 201580017502.8.

* cited by examiner

VIBRATION-DAMPING DEVICE

CROSS REFERENCE TO RELATED APPLICATIONS

This application is a National Stage of International Application No. PCT/JP2015/060594 filed Apr. 3, 2015, claiming priority based on Japanese Patent Application No. 2014-080358 filed Apr. 9, 2014, the contents of which are incorporated herein by reference in their entirety.

TECHNICAL FIELD

The present invention relates to a vibration-damping device which is applied to, for example, vehicles, industrial machines, and so on and which absorbs and attenuates vibrations of vibration generating units such as engines.

BACKGROUND ART

A constitution disclosed in, for example, Patent Document 1 is known as such a type of vibration-damping device. Such a vibration-damping device includes a first tubular attachment member joined to one of a vibration generating unit and a vibration receiving unit, a second attachment member joined to the other of the vibration generating unit and the vibration receiving unit, an elastic body coupling the attachment members to each other, and partition members configured to partition a liquid chamber in the first attachment member in which a liquid is sealed into a first liquid chamber and a second liquid chamber. The vibration-damping device includes a first restricting passage and a second restricting passage through which the first liquid chamber and second liquid chambers communicate with each other, a cylinder chamber provided between the first liquid chamber and the second liquid chamber, and a plunger member arranged movably between an open position and a closed position in the cylinder chamber.

A plurality of types of vibrations with different frequencies such as, for example, idle vibrations and shake vibrations are input to the vibration-damping device. For this reason, resonance frequencies of the first restriction passage and the second restriction passage are set (tuned) to frequencies of the different types of vibrations in the vibration-damping device. The plunger member is moved between the open position and the closed position in accordance with frequencies of the input vibrations so that a restriction passage through which the liquid flows is switched between the first restriction passage and the second restriction passage.

CITATION LIST

Patent Document

[Patent Document 1]
Japanese Unexamined Patent Application, First Publication No. 2007-120598

SUMMARY OF INVENTION

Technical Problem

However, there is room for improvement in terms of simplification of a structure and facilitation of manufacture in the conventional vibration-damping device.

Also, in the conventional vibration-damping device, when unintentional vibrations such as, for example, minute vibrations which are higher in frequency and remarkably smaller in amplitude than a resonance frequency of the restriction passage determined by a path length, a cross-sectional area, and so on of the restriction passage are input, the dynamic spring constant increases due to clogging of the restriction passage or the like. As a result, this may affect product features of the vibration-damping device such as ride comfort of vehicles.

The present invention was made in view of the above-described circumstances, and an object of the present invention is to provide a vibration-damping device in which simplification of a structure and facilitation of manufacture can be achieved while product features are secured.

Solution to Problem

In order to accomplish the object, the present invention suggests the following means.

A first aspect related to the present invention is a vibration-damping device in which at least one of a first liquid chamber and a second liquid chamber has an elastic body as a portion of a wall surface, the vibration-damping device including: a tubular first attachment member joined to one of a vibration generating unit and a vibration receiving unit; a second attachment member joined to the other of the vibration generating unit and the vibration receiving unit; an elastic body which joins the first attachment member to the second attachment member; and a partition member which partitions a liquid chamber in the first attachment member in which a liquid is sealed into the first liquid chamber and the second liquid chamber. In the vibration-damping device, the partition member is provided with a communicating passage through which the first liquid chamber communicates with the second liquid chamber. The communicating passage is provided with a branching section which branches a flow of the liquid flowing between the first liquid chamber and the second liquid chamber via the communicating passage; and a confluence section which joins at least a portion of flows of the liquid which is branched by the branching section to a flow of another portion of the liquid flowing in the communicating passage.

In this case, when the vibrations are input and the liquid flows between the first liquid chamber and the second liquid chamber via the communicating passage, the flow of the liquid is branched by the branching section, and the at least a portion of the branched flows of the liquid is caused to be joined to the flow of another portion of the liquid flowing inside the communicating passage by the confluence section. At this time, when a flow velocity of the liquid flowing into the communicating passage is sufficiently increased, pressure loss of the liquid is increased due to, for example, energy loss occurring when the flows of the liquid that are caused to be joined collide with each other or the like, thereby absorbing and attenuating the vibrations. On the other hand, when the flow velocity of the liquid flowing into the communicating passage is low, the pressure loss of the liquid due to collision of the liquid is suppressed, and the liquid smoothly flows in the communicating passage, thereby suppressing an increase of the dynamic spring constant.

According to the vibration-damping device, the pressure loss of the liquid is increased in accordance with the flow velocity of the liquid flowing in the communicating passage so that the vibration can be absorbed and attenuated. As a result, for example, when normal vibrations such as idle vibrations and shake vibrations are input, the vibrations can be absorbed and attenuated irrespective of frequencies of the vibrations. Therefore, occurrence of abnormal noise is suppressed while a plurality of types of vibrations with different frequencies are absorbed and attenuated so that simplification of a structure and facilitation of manufacture can be achieved.

The liquid smoothly flows in the communicating passage while the pressure loss of the liquid with a low flow velocity is suppressed, thereby suppressing the increase of the dynamic spring constant. For example, when a flow velocity of the liquid is lower than that when normal vibrations are input such as when unintentional vibrations such as minute vibrations higher in frequency and remarkably smaller in amplitude than the normal vibrations are input, the increase of the dynamic spring constant can be suppressed. As a result, product features of the vibration-damping device can be easily secured.

In a second aspect of the present invention, in the vibration-damping device of the first aspect, first confluence sections which join the flows of the liquid which is branched by the branching section to each other is provided as the confluence section.

In this case, since the first confluence sections are provided, the flows of the liquid which is branched by the branching section are caused to collide with each other so that a large part of the liquid can contribute to the energy loss. Thus, the pressure loss of the liquid can be effectively increased.

In a third aspect of the present invention, in the vibration-damping device of the second aspect, a branching body disposed in the communicating passage is provided as the branching section, a passage gap through which the liquid passes in a passage axial direction of the communicating passage is provided between an outer circumferential surface of the branching body and an inner circumferential surface of the communicating passage to surround the branching body. The first confluence sections protrude from positions of the inner circumferential surface of the communicating passage which are shifted with respect to the branching body in the passage axial direction thereof and change the flows of the liquid which is branched by the branching body and passes through the passage gap inward in a surrounding direction in which the passage gap surrounds the branching body.

In this case, the first confluence sections change the flows of the liquid which is branched by the branching body and passes through the passage gap inward in the surrounding direction. Therefore, the flows of the liquid flowing through the passage gap after being branched by the branching body can reliably collide with each other at the position in the communicating passage which is at an inside thereof in the surrounding direction. Thus, the pressure loss of the liquid can be more effectively increased.

In a fourth aspect of the present invention, in the vibration-damping device of the second or third aspect, a plurality of branching passages which constitute the communicating passage and are provided independently of each other as the branching section, and the first confluence sections connect ends of the plurality of branching passages in a passage axial direction as a single body.

In this case, since the first confluence sections connect the ends of the plurality of branching passages in the passage axial direction as the single body, the flows of the liquid flowing through the branching passages independently of each other can be joined in the first confluence sections. Thus, the flows of the liquid can reliably collide with each other in the first confluence sections, and the pressure loss of the liquid can be more effectively increased.

In a fifth aspect of the present invention, in the vibration-damping device according to any one of the first to fourth embodiments, a second confluence section which is provided at the branching section, reverses directions of the flows of the liquid which is branched by the branching section in a flow passage axial direction of the communicating passage, and joins the flows of the liquid to a flow of another portion of the liquid as the confluence section.

In this case, since the second confluence section is provided at the branching section, for example, simplification of a structure of the vibration-damping device can be achieved.

In a sixth aspect of the present invention, in the vibration-damping device of the fifth aspect, a branching body disposed in the communicating passage is provided as the branching section, a passage gap through which the liquid passes in a passage axial direction of the communicating passage is provided between an outer circumferential surface of the branching body and an inner circumferential surface of the communicating passage to surround the branching body. The branching body flows the liquid on the branching body outward in a surrounding direction in which the passage gap surrounds the branching body to branch a flow of the liquid. The second confluence section is provided at an end of the branching body of an outside in the surrounding direction and joins a flow of the liquid flowing on the branching body to a flow of the liquid flowing toward the passage gap along an inner circumferential surface of the communicating passage among the liquid flowing in the communicating passage.

In this case, the second confluence section joins the flow of the liquid on the branching body to the flow of another portion of the liquid flowing toward the passage gap along the inner circumferential surface of the communicating passage among the liquid flowing in the communicating passage. Therefore, the liquid having a relatively high flow velocity which flows along the flow passage axis inside the communicating passage is branched by the branching body and can thus collide with another portion of the liquid having a relatively low flow velocity which flows along the inner circumferential surface of the communicating passage inside the communicating passage. Thus, the pressure loss of the liquid can be more effectively increased.

In a seventh aspect of the present invention, in the vibration-damping device according to any one of the first to sixth embodiments, a branching body disposed in the communicating passage is provided as the branching section, in which the branching body is disposed on a flow passage axis of the communicating passage.

In this case, the branching body is disposed on the flow passage axis of the communicating passage. Therefore, the liquid flowing in the communicating passage is caused to flow on the branching body so that the flow of the liquid can be branched outward in the radial direction of the communicating passage. Thus, the flow of the liquid can be reliably branched.

In an eighth aspect of the present invention, in the vibration-damping device of the seventh aspect, the branching body is provided with a turning section which directs the liquid flowing on the branching body toward an outside in a radial direction of the communicating passage and turns the liquid in a flow passage circumferential direction about the flow passage axis.

In this case, the branching body is provided with the turning section. Therefore, when the flow velocity of the liquid flowing inside the communicating passage is increased, pressure loss of the liquid can also be increased due to energy loss due to a swirl flow formed when the flow of the liquid is changed as well as energy loss occurring when the flows of the liquid collide with each other. Thus, the vibrations can be effectively absorbed and attenuated.

In a ninth aspect of the present invention, in the vibration-damping device according to any one of the first to eighth aspects, the plurality of communicating passages are provided in the partition member in a circumferential direction of the partition member and pass through the partition member in an axial direction of the partition member.

In this case, since the plurality of communicating passages are provided in the partition member in the circumferential direction and pass through the partition member in the axial direction, a flow passage area of the communicating passages can be easily secured. Therefore, when the vibrations are input to the vibration-damping device and the flow velocity of the liquid in the communicating passage is increased, flows of large amounts of liquid collide with each other in the communicating passage, and thus the pressure loss of the liquid can be significantly increased easily. Thus, the vibrations can be effectively absorbed and attenuated.

In a tenth aspect of the present invention, in the vibration-damping device according to any one of the first to ninth aspects, the partition member is provided with a restricting passage which is provided independently from the communicating passage and through which the first liquid chamber communicates with the second liquid chamber.

In this case, the flow velocity of the liquid flowing through the communicating passage when the vibrations are input is increased and the pressure loss of the liquid is increased so that flow resistance of the liquid passing through the communicating passage is increased. As a result, the liquid actively flows between the first liquid chamber and the second liquid chamber via the restricting passage. At this time, resonance is generated in the restricting passage, thereby further absorbing and attenuating the input vibrations.

As described above, for example, when the normal vibrations are input, the vibrations can also be absorbed and attenuated by resonance in the restricting passage in addition to the pressure loss of the liquid. Thus, the vibrations can be effectively absorbed and attenuated.

Advantageous Effects of Invention

According to the present invention, simplification of a structure and facilitation of manufacture can be achieved while product features are secured.

DESCRIPTION OF EMBODIMENTS (First Embodiment)

Hereinafter, a first embodiment of a vibration-damping device related to the present invention will be described with reference to FIGS. 1 to 3.

Figure 1:
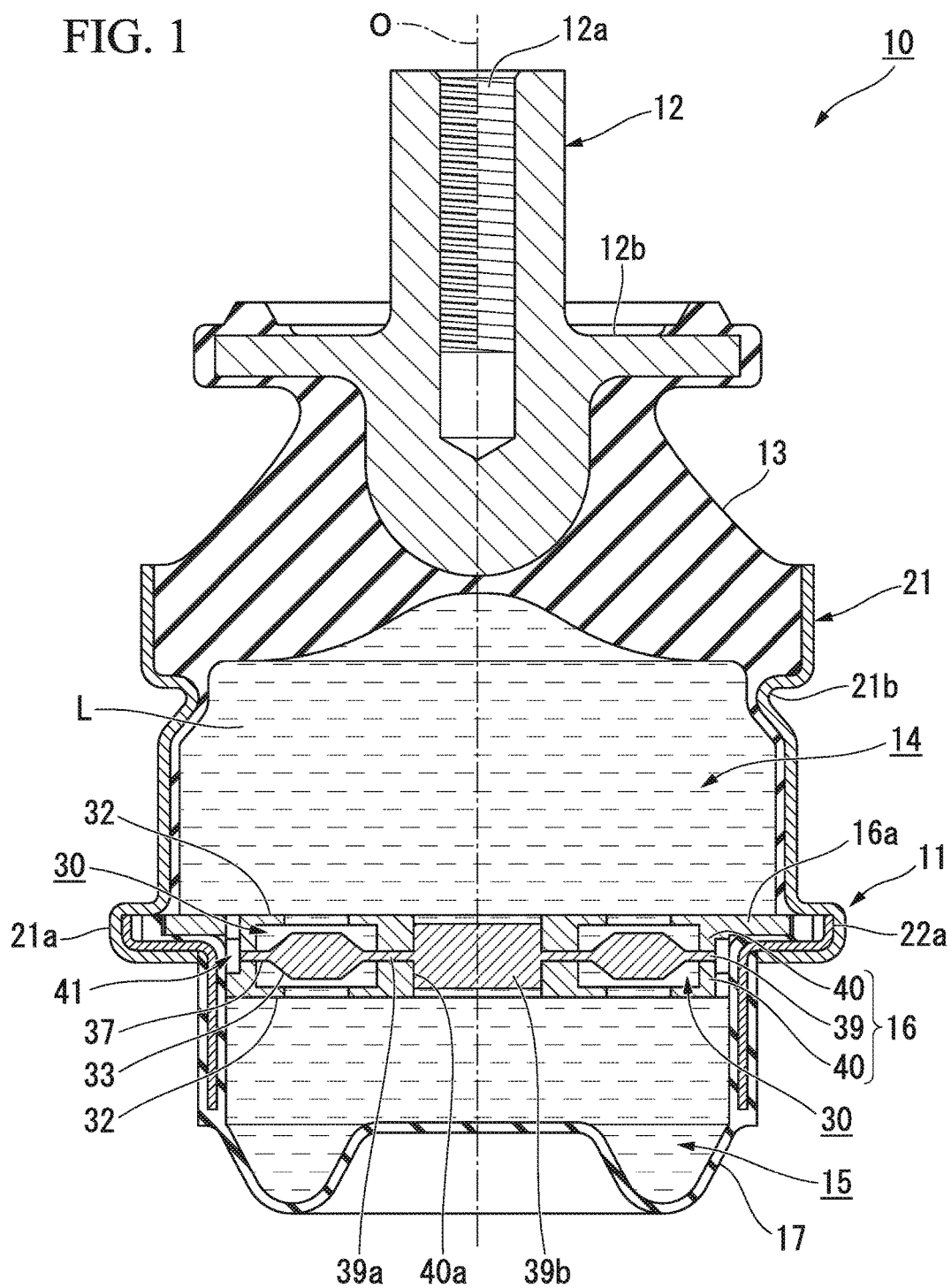
FIG. 1 is a longitudinal cross-sectional view of a vibration-damping device related to a first embodiment of the present invention.

As shown in FIG. 1, a vibration-damping device 10 is provided with a tubular first attachment member 11 joined to one of a vibration generating unit and a vibration receiving unit, a second attachment member 12 joined to the other of the vibration generating unit and the vibration receiving unit, an elastic body 13 which joins the first attachment member 11 to the second attachment member 12, and a partition member 16 which partitions a liquid chamber in the first attachment member 11 in which a liquid L is sealed into a main liquid chamber (a first liquid chamber) 14 having the elastic body 13 as a portion of a wall surface thereof and a subsidiary liquid chamber (a second liquid chamber) 15.

In the illustrated example, the second attachment member 12 is formed in a columnar shape, the elastic body 13 is formed in a tubular shape, and the first attachment member 11, the second attachment member 12, and the elastic body 13 are disposed coaxially with a common axis. Hereinafter, the common axis is referred to as an axis O (an axis of the first attachment member or an axis of the partition member), the main liquid chamber 14 side in an axial O direction (a passage axial direction of the communicating passage or an axial direction of the partition member) is referred to as one side, the subsidiary liquid chamber 15 side is referred to as the other side, a direction perpendicular to the axis O is referred to as a radial direction (a radial direction of the first attachment member or a radial direction of the partition member), and a direction around the axis O is referred to as a circumferential direction (a circumferential direction of the first attachment member or a circumferential direction of the partition member).

When the vibration-damping device 10 is mounted in, for example, a vehicle, the second attachment member 12 is joined to an engine serving as a vibration generating unit, and the first attachment member 11 is joined to a vehicle body serving as a vibration receiving unit via a bracket (not shown), thereby suppressing vibrations of the engine from being transferred to the vehicle body. The vibration-damping device 10 is a liquid sealed type in which the liquid L such as, for example, ethylene glycol, water, or silicone oil, is sealed in the liquid chamber of the first attachment member 11.

The first attachment member 11 is provided with a one-side outer rim body 21 on the one side in the axial O direction and an other-side outer rim body 22 on the other side.

The elastic body 13 is joined to an end of the one-side outer rim body 21 on the one side in a liquid-tight state, and an opening of the one-side outer rim body 21 of the one side is closed by the elastic body 13. An end 21a of the one-side outer rim body 21 of the other side is formed larger in diameter than other portions. Also, an inside of the one-side outer rim body 21 is the main liquid chamber 14. A liquid pressure of the main liquid chamber 14 changes as the elastic body 13 is deformed when vibrations are input and an inner capacity of the main liquid chamber 14 is thus changed.

An annular groove 21b of the one-side outer rim body 21 which continuously extends throughout the circumference thereof about the axis O is formed in a portion connected from the other side to a portion of the one-side outer rim body 21 to which the elastic body 13 is joined.

A diaphragm 17 is joined to an end of the other-side outer rim body 22 on the other side in a liquid-tight state, and an opening of the other-side outer rim body 22 on the other side is closed by the diaphragm 17. An end 22a of the other-side outer rim body 22 on the one side is formed larger in diameter than other portions and is fitted into the end 21a of the one-side outer rim body 21 on the other side. The partition member 16 is fitted into the other-side outer rim body 22. A portion inside the other-side outer rim body 22 which is between the partition member 16 and the diaphragm 17 is the subsidiary liquid chamber 15. The subsidiary liquid chamber 15 has the diaphragm 17 as a portion of a wall surface and is expanded or contracted as the diaphragm 17 is deformed. The other-side outer rim body 22 is covered with a rubber membrane integrally formed with the diaphragm 17 over approximately the entire area.

A female threaded part 12a is formed on an end surface of the second attachment member 12 on the one side coaxially with the axis O. The second attachment member 12 protrudes from the first attachment member 11 on the one side. A flange part 12b which protrudes outward in a radial direction and continuously extends throughout the circumference of the second attachment member 12 about the axis O is formed on the second attachment member 12. The flange part 12b is spaced apart from an edge of the first attachment member 11 on the one side, on the one side.

The elastic body 13 is formed of an elastic member such as, for example, a rubber material and is formed in a tubular shape whose diameter is gradually increased from the one side to the other side. An end of the elastic body 13 on the one side is joined to the second attachment member 12, and an end thereof on the other side is joined to the first attachment member 11.

An inner circumferential surface of the one-side outer rim body 21 of the first attachment member 11 is covered with a rubber membrane integrally formed with the elastic body 13 over approximately the entire area.

The partition member 16 is formed in a discoid shape which is disposed coaxially with the axis O and is fitted into the first attachment member 11. The partition member 16 is provided with a flange part 16a which protrudes outward in a radial direction. The flange part 16a is provided at an end of the partition member 16 on the one side. The flange part 16a is disposed in the end 22a of the other-side outer rim body 22 on the one side.

The partition member 16 is provided with communicating passages 30 through which the main liquid chamber 14 communicates with the subsidiary liquid chamber 15. In the illustrated example, the plurality of communicating passages 30 are provided at the partition member 16 in the circumferential direction and pass through the partition member 16 in the axial O direction. The plurality of communicating passages 30 are intermittently disposed in the partition member 16 throughout the circumference in the circumferential direction of the partition member 16 about the axis O. In other words, the plurality of communicating passages 30 are disposed on the same circumference about the axis O and constitute an annular passage row 31.

Figure 3:
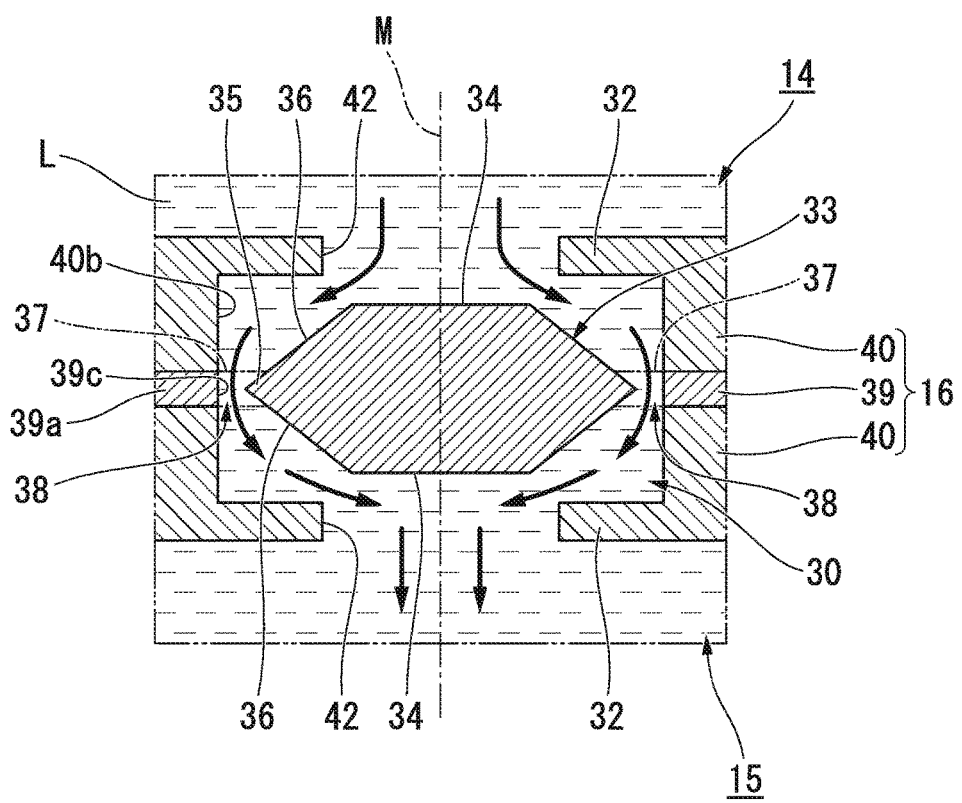
FIG. 3 is a longitudinal cross-sectional view showing a major part of the partition member shown in FIG. 2.

As shown in FIG. 3, the communicating passages 30 extend in the axial O direction and are each open at both end surfaces of the partition member 16 in the axial O direction. The communicating passage 30 extends in a linear shape in the axial O direction in a longitudinal cross-sectional view in the axial O direction of the partition member 16 and is formed in a circular shape in a planar view of the partition member 16 viewed in the axial O direction. In the communicating passage 30, a flow passage axis M extending in parallel with the axis O is provided as a central axis. In other words, the communicating passage 30 is formed in a cylindrical shape which extends in the axial O direction and a flow passage axis M direction.

Annular throttling sections (first confluence sections) 32 which protrude inward in a flow passage radial direction (a surrounding direction) about the flow passage axis M of the communicating passage 30 are each provided at both sides of the communicating passage 30 in the axial O direction. The throttling sections 32 are disposed coaxially with the flow passage axis M of the communicating passage 30, and spaces (passages 42) inside the throttling sections 32 in the flow passage radial direction form ends of the communicating passage 30 in the axial O direction. In other words, flow passage diameters of both ends of the communicating passage 30 in the axial O direction are smaller than a flow passage diameter of an intermediate section between the ends.

In this embodiment, a branching body (a branching section or a branching rigid body) 33 is provided in the communicating passage 30. The branching body 33 is provided in each of the plurality of communicating passages 30. The branching body 33 branches a flow of the liquid L flowing in the communicating passage 30 through which the main liquid chamber 14 communicates with the subsidiary liquid chamber 15.

As shown in FIG. 3, the branching body 33 branches the flow of the liquid L flowing in the communicating passage 30. The branching body 33 bends the flow of the liquid L by flowing the liquid L flowing in the communicating passage 30 along a surface of the branching body 33. The branching body 33 is made of, for example, a resin material or the like and is integrally formed with the partition member 16 as a rigid body with sufficient rigidity that the branching body 33 is not deformed when the branching body 33 receives the flow of the liquid L.

The branching body 33 is accommodated in the intermediate section of the communicating passage 30 in the axial O direction and is provided at a position different from those of the throttling sections 32 in the axial O direction. The branching body 33 is disposed on the flow passage axis M to be spaced apart from an inner circumferential surface of the communicating passage 30 in the flow passage radial direction. The branching body 33 is formed in a cylindrical shape which is disposed coaxially with the flow passage axis M. The branching body 33 is formed in a shape in which the branching body 33 is symmetrical in the axial O direction. In the illustrated example, the branching body 33 is formed in a shape in which a pair of circular truncated cones are constituted such that bottom surfaces thereof abut each other in the axial O direction.

The branching body 33 is gradually reduced in diameter from a central portion of the branching body 33 in the axial O direction toward one side thereof and the other side thereof in the axial O direction. A pair of end surfaces 34 of the branching body 33 which face one end side and the other end side in the axial O direction are flat planes which extend to be perpendicular to the flow passage axis M. A central portion in the axial O direction of an outer circumferential surface of the branching body 33 is provided with acute angle sections 35 which are convex outward in the flow passage radial direction. Each of the acute angle sections 35 partitions the outer circumferential surface of the branching body 33 into a pair of tapered surfaces 36 which are adjacent to each other in the axial O direction. Each of the tapered surfaces 36 joins the acute angle section 35 to one of the end surfaces 34 in a flow passage circumferential direction about the flow passage axis M throughout the circumference of the branching body 33 and is gradually reduced in diameter from the acute angle section 35 toward the end surfaces 34. Note that an outer diameter of the acute angle section 35 is greater than an inner diameter of each of the throttling sections 32, and an outer diameter of the end surface 34 of the branching body 33 is smaller than the inner diameter of the throttling section 32.

Figure 2:
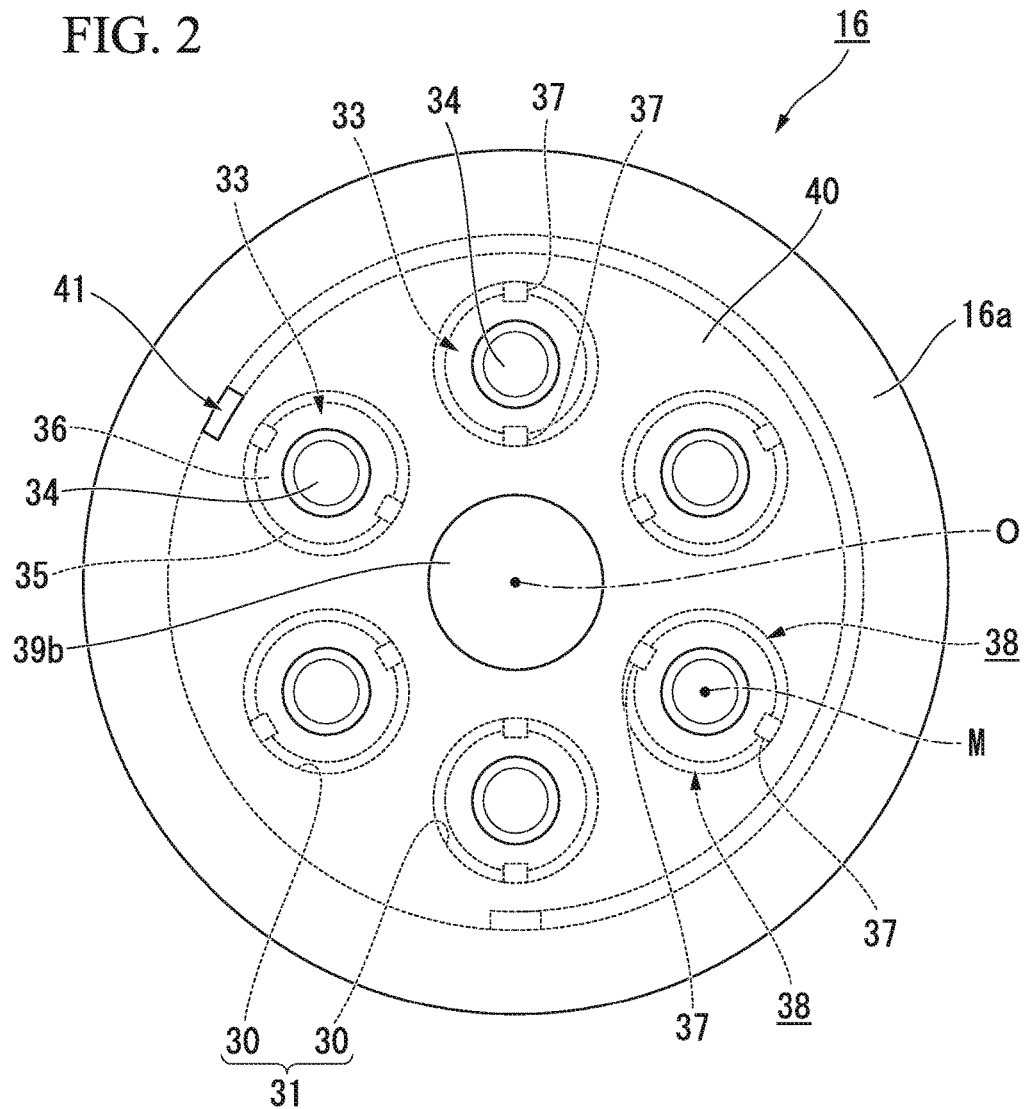
FIG. 2 is a plan view showing a partition member constituting the vibration-damping device shown in FIG. 1.

As shown in FIGS. 2 and 3, the branching body 33 is joined to the partition member 16 via bridge sections 37. Each of the bridge sections 37 joins the acute angle section 35 which is provided at the central portion of the outer circumferential surface of the branching body 33 in the axial O direction to the central portion in the axial O direction of the inner circumferential surface of the communicating passage 30. The pair of bridge sections 37 are formed in a rod shape which extends in the flow passage radial direction and are disposed to surround the flow passage axis M from an outside in the flow passage radial direction. A portion of the communicating passage 30 which is surrounded by the pair of bridge sections 37 disposed in the flow passage circumferential direction is provided with passage gaps 38 which are open toward one side and the other side in the axial O direction and through which the liquid L passes in the axial O direction. The pair of passage gaps 38 are provided as spaces between the outer circumferential surface of the branching body 33 and the inner circumferential surface of the communicating passage 30. The pair of passage gaps 38 surround the branching body 33 in the flow passage radial direction in the planar view.

As shown in FIGS. 1 and 3, the partition member 16 is formed by three dividing bodies including a central dividing body 39 and a pair of outer dividing bodies 40. The partition member 16 is formed such that the central dividing body 39 is surrounded by the pair of outer dividing bodies 40 from the one side and the other side in the axial O direction. For example, the partition member 16 is formed such that the three dividing bodies 39 and 40 are fixed by fixing means (not shown) such as bolts in the axial O direction.

The central dividing body 39 is provided with a plate-shaped main body 39a which faces the one side and the other side in the axial O direction. The main body 39a is disposed coaxially with the axis O, and a shaft 39b which extends in the axial O direction passes through a central portion of the main body 39a in a radial direction. The shaft 39b is disposed coaxially with the axis O and protrudes toward the one side and the other side in the axial O direction from the main body 39a. The central dividing body 39 is formed with a plurality of through holes 39c which constitute the communicating passage 30. The branching body 33 is disposed in each of the through holes 39c, and the branching body 33 is integrally joined to an inner circumferential surface of the through hole 39c via the bridge section 37.

The pair of outer dividing bodies 40 are formed in the same shape and size. The outer dividing bodies 40 are each formed in plate shapes which face the one side and the other side in the axial O direction and are disposed coaxially with the axis O. The outer dividing body 40 is formed with one mounting hole 40a and a plurality of flow passage forming holes 40b which pass through the outer dividing body 40 in the axial O direction. The mounting hole 40a is disposed coaxially with the axis O, and the shaft 39b is fitted into the mounting hole 40a. The flow passage forming holes 40b constitute the communicating passage 30.

In this embodiment, the partition member 16 is provided with a restricting passage 41. The restricting passage 41 is provided in the partition member 16 independently from the communicating passage 30. A flow passage cross-sectional area of the restricting passage 41 is the same over the entire length of the restricting passage 41 in the flow passage axis M direction. Resonant frequencies of the restricting passage 41 are the same frequencies as vibrations which are normally input to the vibration-damping device 10, and the restricting passage 41 generates resonance (liquid column resonance) in response to an input of such normal vibrations (first vibrations). An example of the normal vibrations includes shake vibrations (for example, whose frequencies are 14 Hz or less and whose amplitudes are greater than±0.5 mm), idle vibrations (for example, whose frequencies are 18 Hz to 30 Hz and whose amplitudes are ±0.5 mm or less) higher in frequency and smaller in amplitude than the shake vibrations, and so on.

The resonant frequencies of the restricting passage 41 are lower than resonant frequencies of the passages 42 provided inside each of the plurality of throttling sections 32. The resonant frequencies of the passages 42 are the same as each other. The resonant frequencies of the passages 42 are the same as frequencies of unintentional vibrations (second vibrations) such as, for example, minute vibrations higher in frequency and remarkably smaller in amplitude than the above-described normal vibrations. The resonant frequencies of the passages 42 and the restricting passage 41 are each determined based on, for example, flow passage lengths, flow passage cross-sectional areas, and so on thereof.

Note that the communicating passage 30 is constituted such that the liquid L preferentially flows more easily through the communicating passage 30 than the restricting passage 41 immediately after the normal vibrations are input to the vibration-damping device 10. Such a constitution can be realized by adjusting, for example, the flow passage lengths, the flow passage cross-sectional areas, and so on of the restricting passage 41 and the communicating passage 30.

Next, an action of the vibration-damping device 10 will be described.

When the vibrations in the axial O direction are input to the vibration-damping device 10 as shown in FIG. 1 from the vibration generating unit, both of the attachment members 11 and 12 are relatively displaced while elastically deforming the elastic body 13 so that a liquid pressure of the main liquid chamber 14 changes. Thus, the liquid L is caused to reciprocate between the main liquid chamber 14 and the subsidiary liquid chamber 15 via the communicating passage 30. At this time, in this embodiment, the liquid L is caused to preferentially reciprocate via the communicating passage 30 compared to the restricting passage 41. When the liquid L in the main liquid chamber 14 is caused to flow toward the subsidiary liquid chamber 15 via the communicating passage 30, the liquid L flows into the communicating passage 30 from an inside (the passage 42) of the throttling section 32 on the one side serving as an end of the communicating passage 30 on the one side and reaches a portion of the communicating passage 30 at which the branching body 33 is located as shown in FIG. 3.

The branching body 33 branches the flow of the liquid L which flows in the communicating passage 30 outward in the flow passage radial direction. At this time, the liquid L flows along the tapered surfaces 36 in the surface of the branching body 33 so that the flow of the liquid L is branched outward in the flow passage radial direction while being directed to the other side. Also, the liquid L passes through the passage gaps 38 in the communicating passage 30 in the axial O direction.

After that, the throttling section 32 on the other side, which is disposed at a position different from that of the branching body 33 in the axial O direction, directs the flow of the liquid L passing through the passage gaps 38 toward the inside in the flow passage radial direction. Thus, the flows of the liquid L which is branched by the branching body 33 are joined such that directions thereof face each other.

Here, vibrations such as, for example, idle vibrations or shake vibrations are normally input to the vibration-damping device 10. The idle vibrations among the vibrations have relatively small amplitudes but high frequencies, and the shake vibrations have low frequencies but great amplitudes. Therefore, when such normal vibrations are input, a flow velocity of the liquid L flowing in the communicating passage 30 can be increased to a predetermined value or more.

As a result, pressure loss of the liquid L is increased due to, for example, energy loss occurring when the flows of the liquid L that are joined by the throttling section 32 collide with each other, viscous resistance of the liquid L, energy loss occurring when the flow of the liquid L is changed, energy loss due to friction between the liquid L and the throttling section 32, and so on, thereby absorbing and attenuating the vibrations.

The liquid L whose flows are joined by the throttling section 32 passes through the inside (the passage 42) of the throttling section 32 serving as an end of the communicating passage 30 on the other side and flows into the subsidiary liquid chamber 15.

When the liquid L in the subsidiary liquid chamber 15 is caused to flow toward the main liquid chamber 14 via the communicating passage 30, the liquid L flows into the communicating passage 30 from the inside (the passage 42) of the throttling section 32 on the other side serving as the end of the communicating passage 30 on the other side and reaches a portion of the communicating passage 30 at which the branching body 33 is located. At this time, the branching body 33 branches the flow of the liquid L which flows in the communicating passage 30 outward in the flow passage radial direction. After that, the flows of the liquid L which is branched by the branching body 33 are joined to each other by the throttling section 32 on the one side. Even at this time, when the flow velocity of the liquid L is a predetermined value or more, the pressure loss of the liquid L is increased, and the vibrations can thus be absorbed and attenuated.

As described above, when the pressure of the liquid L is increased, flow resistance of the liquid L passing through the communicating passage 30 is increased. As a result, the liquid L actively flows between the main liquid chamber 14 and the subsidiary liquid chamber 15 via the restricting passage 41. At this time, resonance is generated in the restricting passage 41, thereby further absorbing and attenuating the input vibrations.

For example, minute vibrations higher in frequency and remarkably smaller in amplitude than estimated or the like are unintentionally input to the vibration-damping device 10 in some cases. When the minute vibrations are input, the flow velocity of the liquid L flowing into the communicating passage 30 is low. Thus, the pressure loss of the liquid L is also suppressed by joining the flows of the liquid L which is branched by the branching body 33 through the throttling section 32. Thus, since the liquid L passes through the communicating passage 30 and smoothly flows between the main liquid chamber 14 and the subsidiary liquid chamber 15, an increase in a dynamic spring constant is suppressed.

As described above, according to the vibration-damping device 10 related to this embodiment, the pressure loss of the liquid L is increased in accordance with the flow velocity of the liquid L flowing in the communicating passage 30 so that the vibrations can be absorbed and attenuated. When normal vibrations such as, for example, idle vibrations or shake vibrations are input, the vibrations can be absorbed and attenuated irrespective of frequencies of the vibrations. Therefore, abnormal noise is suppressed while a plurality of types of vibrations with different frequencies are absorbed and attenuated so that simplification of a structure and facilitation of manufacture can be achieved.

Also, for example, when the normal vibrations are input, the vibrations can also be absorbed and attenuated by resonance in the restricting passage 41 in addition to the pressure loss of the liquid L. Thus, the vibrations can be effectively absorbed and attenuated.

The liquid L smoothly passes through the communicating passage 30 in a state in which the flow velocity is low and the pressure loss of the liquid L is suppressed so that the increased in the dynamic spring constant is suppressed. When unintentional vibrations such as, for example, minute vibrations higher in frequency and remarkably smaller in amplitude than the normal vibrations are input, if the flow velocity of the liquid L is lower than that when the normal vibrations are input, the increase in the dynamic spring constant can be suppressed. As a result, product features of the vibration-damping device 10 can be easily secured.

Since the throttling section 32 is provided, the flows of the liquid L which is branched by the branching body 33 are caused to collide with each other so that a large part of the liquid L can contribute to the energy loss. Thus, the pressure loss of the liquid L can be effectively increased.

Also, the throttling section 32 changes the flows of the liquid L which is branched by the branching body 33 and flows through the passage gaps 38 inward in the flow passage radial direction. Therefore, the flows of the liquid L flowing through the passage gaps 38 after being branched by the branching body 33 can be caused to reliably collide with each other at a portion of the communicating passage 30 inside in the flow passage radial direction. Thus, the pressure loss of the liquid L can be more effectively increased.

The branching body 33 is disposed on the flow passage axis M of the communicating passage 30. In other words, the liquid L flowing in the communicating passage 30 is caused to flow on the branching body 33 so that the flow of the liquid L can be caused to be branched outward in the flow passage radial direction. Thus, the flow of the liquid L can be caused to be reliably branched.

The plurality of communicating passages 30 are provided in the partition member 16 in the circumferential direction and pass through the partition member 16 in the axial O direction. Thus, a flow passage area of each of the communicating passages 30 can be easily secured. Therefore, when the vibrations are input to the vibration-damping device 10 and the flow velocity of the liquid L in the communicating passage 30 is increased, flows of large amounts of liquid L collide with each other in the communicating passage 30, and thus the pressure loss of the liquid L can be significantly increased easily. Thus, the vibrations can be effectively absorbed and attenuated.

(Second Embodiment)

Next, a vibration-damping device related to a second embodiment of the present invention will be described with reference to FIGS. 4 and 5.

Note that, in the second embodiment, the same elements as those in the first embodiment are denoted by the same reference numerals, overlapping descriptions will be omitted, and only differences thereof will be described.

Figure 4:
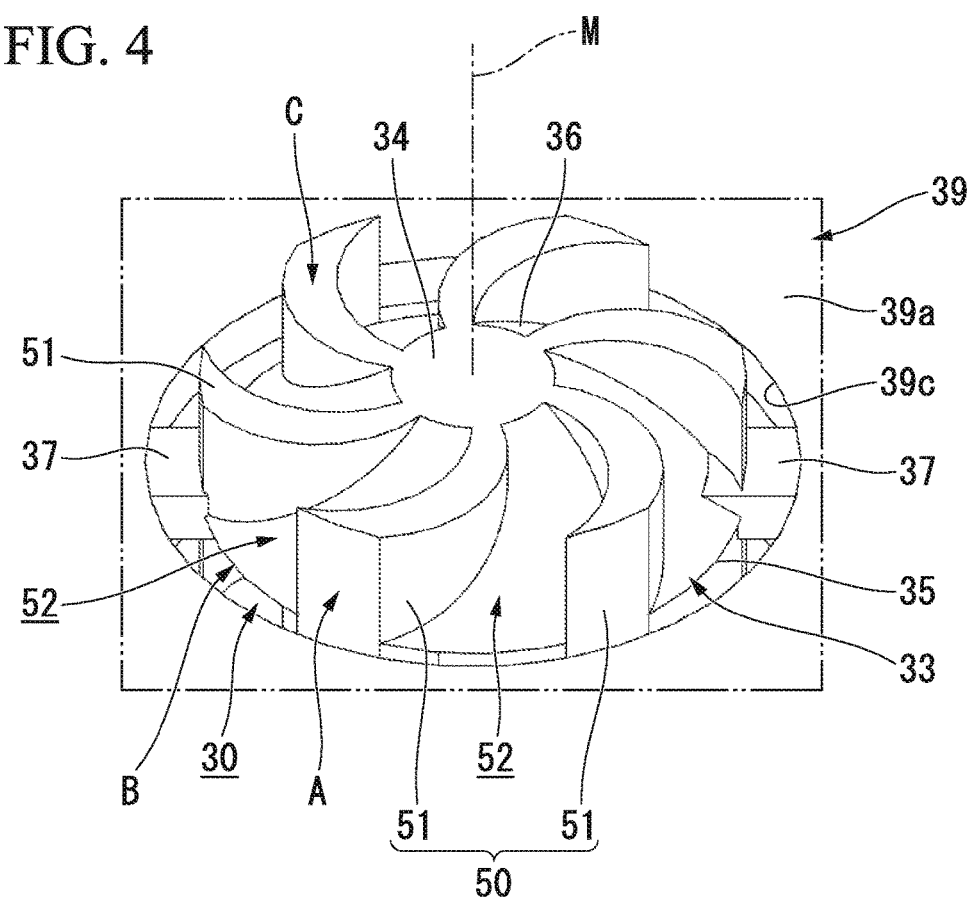
FIG. 4 is a perspective view of a branching body constituting a partition member included in a vibration-damping device related to a second embodiment of the present invention.
Figure 5:
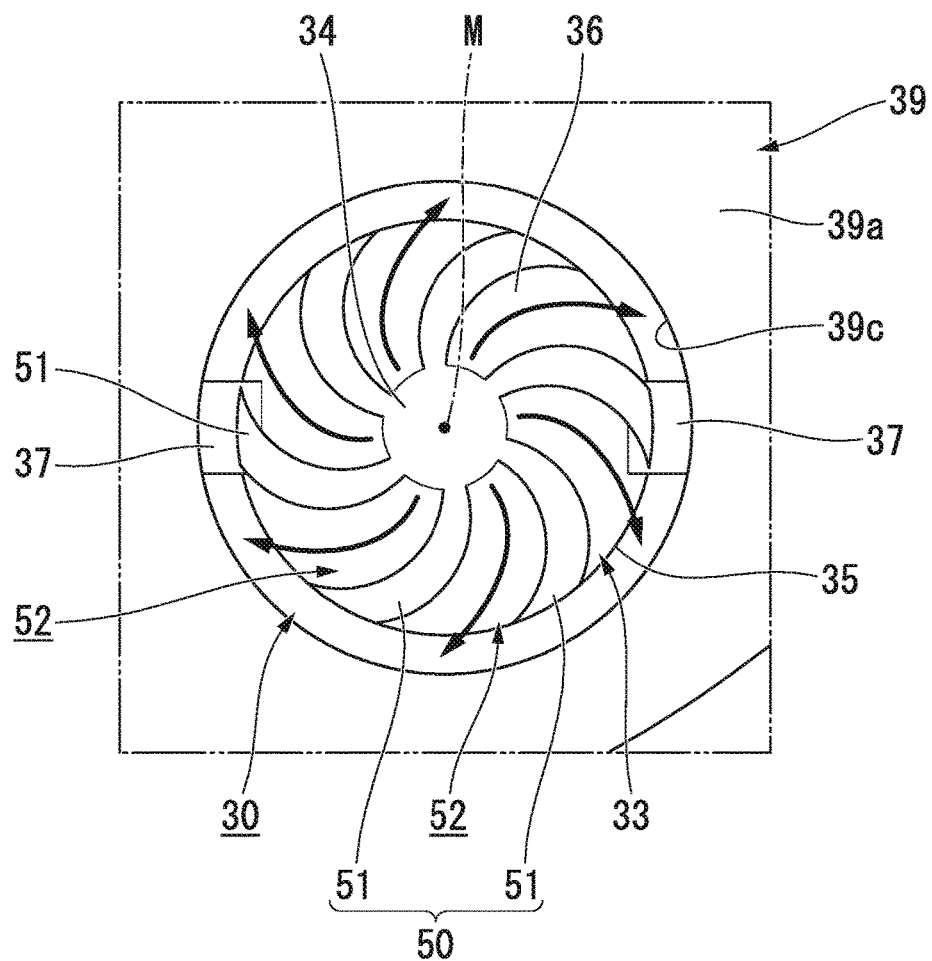
FIG. 5 is a plan view of the branching body shown in FIG. 4.

As shown in FIGS. 4 and 5, in the vibration-damping device of this embodiment, a branching body 33 is provided with a turning section 50. The turning section 50 directs the liquid L flowing on the branching body 33 toward the outside in the flow passage radial direction and turns a liquid L in the flow passage circumferential direction about the flow passage axis M. The turning section 50 is provided with a plurality of ridge sections 51 which are formed in the same shape and size.

The ridge sections 51 extend outward in flow passage radial direction from a pair of end surfaces 34 of the branching body 33 which face the one side and the other side in the axial O direction. The ridge sections 51 each extend and are bent in one direction in the flow passage circumferential direction while being directed to the outside in the flow passage radial direction. The ridge section 51 is bent to be convex in the other direction in the flow passage circumferential direction in a planar view of the branching body 33 viewed in the axial O direction. The width of the ridge sections 51 in the flow passage circumferential direction is gradually increased from the inside in the flow passage radial direction toward the outside. A projecting end surface A of the ridge sections 51 which faces the outside in the flow passage radial direction is flush with an edge B in the flow passage radial direction of an acute angle section 35 of the branching body 33. Top surfaces C of the ridge sections 51 which face the one side and the other side in the axial O direction are flush with the end surfaces 34 of the branching body 33.

The plurality of ridge sections 51 are disposed at equal intervals in the flow passage circumferential direction, and turning paths 52 extending in the flow passage radial direction are provided between the ridge sections 51 which are adjacent to each other in the flow passage circumferential direction. The turning paths 52 each extend outward in the flow passage radial direction from the end surfaces 34 of the branching body 33 and reach the acute angle section 35 of the branching body 33. The turning path 52 is defined by both lateral surfaces which face each other in the ridge sections 51 adjacent to each other in the flow passage circumferential direction and a portion between the ridge sections 51 of the tapered surface 36 which are adjacent to each other in the flow passage circumferential direction.

When the vibrations in the axial O direction are input to the vibration-damping device from the vibration generating unit and the liquid L reaches the portion of the communicating passage 30 at which the branching body 33 is located and flows on the tapered surfaces 36 of the branching body 33, as shown in FIG. 5, the liquid L flows through the turning paths 52 so that the liquid L is turned in the flow passage circumferential direction while being directed to the outside in the flow passage radial direction.

As described above, according to the vibration-damping device related to this embodiment, the branching body 33 is provided with the turning section 50. Therefore, when a flow velocity of the liquid L flowing in the communicating passage 30 is increased, pressure loss of the liquid L can also be increased due to energy loss due to a swirl flow formed when the flow of the liquid L is changed as well as energy loss occurring when the flows of the liquid L that are joined by the throttling section 32 collide with each other. Thus, the vibrations can be effectively absorbed and attenuated.

(Third Embodiment)

Next, a vibration-damping device related to a third embodiment of the present invention will be described with reference to FIGS. 6 and 7.

Note that, in the third embodiment, the same elements as those in the second embodiment are denoted by the same reference numerals, overlapping descriptions will be omitted, and only differences thereof will be described.

Figure 6:
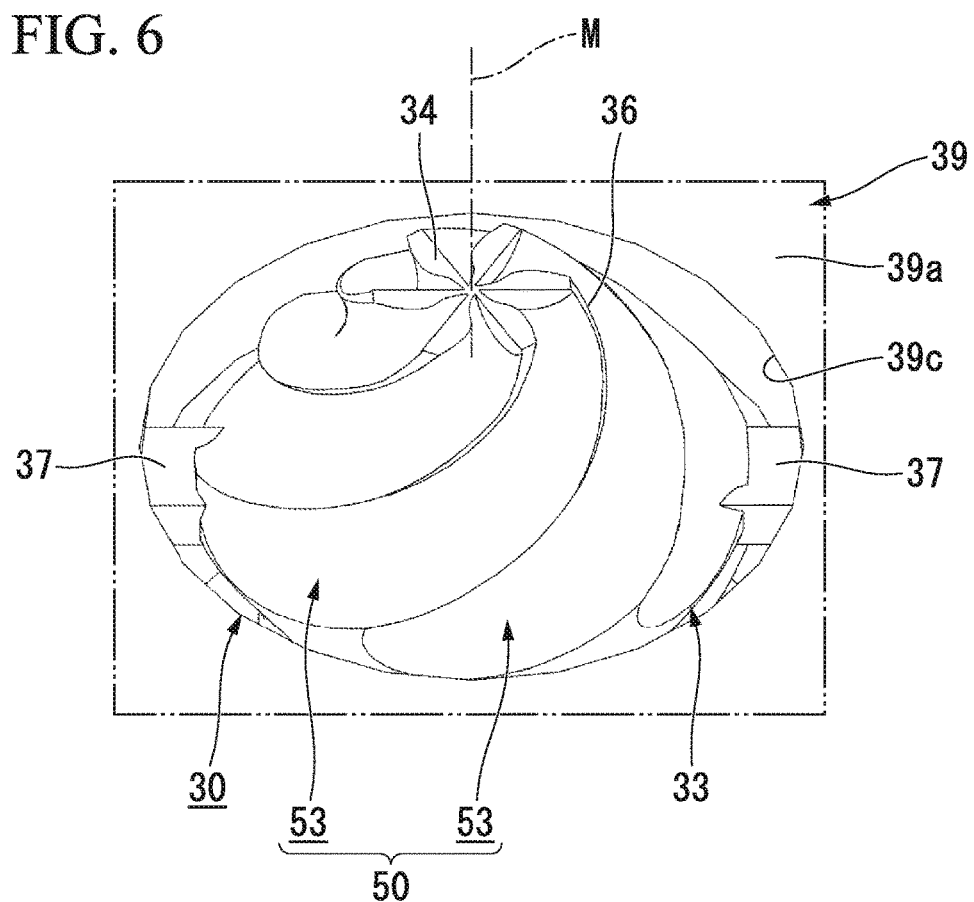
FIG. 6 is a perspective view of a branching body constituting a partition member included in a vibration-damping device related to a third embodiment of the present invention.
Figure 7:
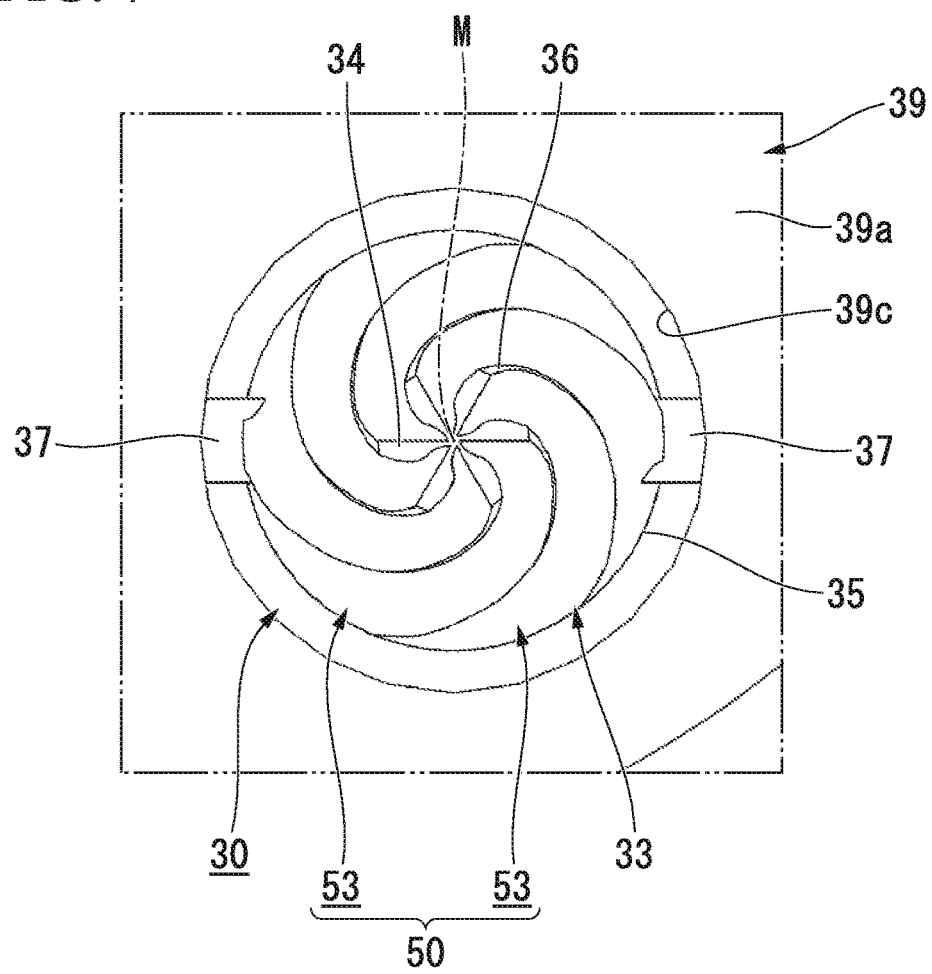
FIG. 7 is a plan view of the branching body shown in FIG. 6.

As shown in FIGS. 6 and 7, in the vibration-damping device of this embodiment, a turning section 50 is provided with a plurality of concave sections 53 which are formed in the same shape and size. The concave sections 53 each extend outward in the flow passage radial direction from a pair of end surfaces 34 of a branching body 33 which face the one side and the other side in the axial O direction. The end of the concave section 53 of an inside in the flow passage radial direction is open at the end surface 34 of the branching body 33. The concave section 53 extends to be curved in one direction in the flow passage circumferential direction about the flow passage axis M while being directed to the outside in the flow passage radial direction. The concave section 53 is curved to be convex in the other direction in the flow passage circumferential direction in the planar view. The plurality of concave sections 53 are disposed to be adjacent to each other in the flow passage circumferential direction, and the width in the flow passage circumferential direction of the tapered surface 36 between the concave sections 53 which are adjacent to each other in the flow passage circumferential direction is smaller than the width in the flow passage circumferential direction of the concave section 53.

When the vibrations in the axial O direction are input to the vibration-damping device from the vibration generating unit and the liquid L flows on the tapered surfaces 36 of the branching body 33, the liquid L flows through the concave section 53. Thus, the liquid L is turned in the flow passage circumferential direction while being directed to the outside in the flow passage radial direction.

(Fourth Embodiment)

Next, a vibration-damping device 60 related to a fourth embodiment of the present invention will be described with reference to FIGS. 8 to 10.

Note that, in the fourth embodiment, the same elements as those in the first embodiment are denoted by the same reference numerals, overlapping descriptions will be omitted, and only differences thereof will be described.

Figure 8:
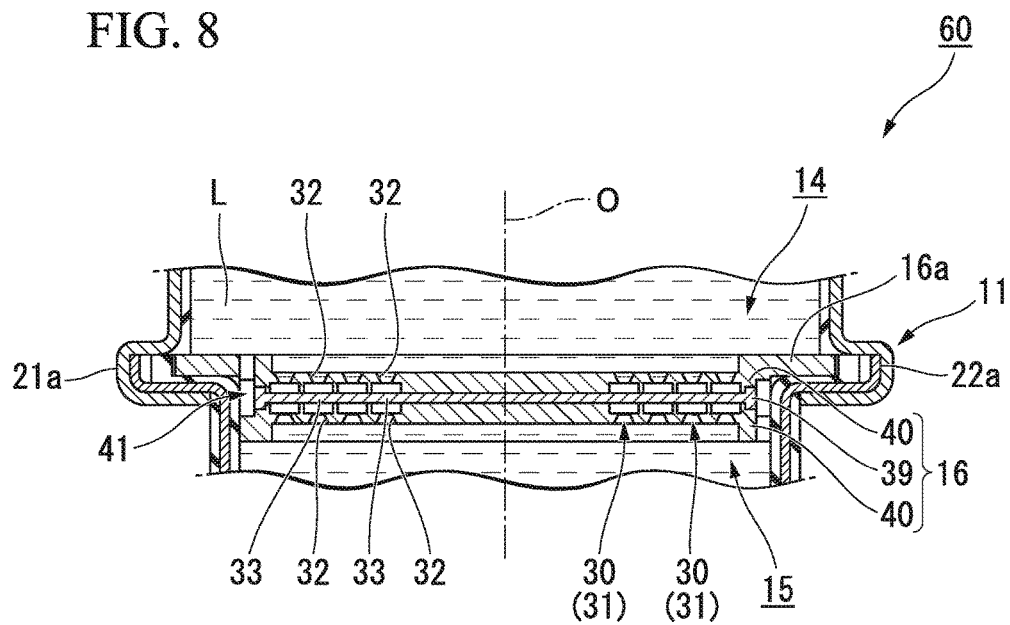
FIG. 8 is a longitudinal cross-sectional view of a portion near a partition member in a vibration-damping device related to a fourth embodiment of the present invention.
Figure 9:
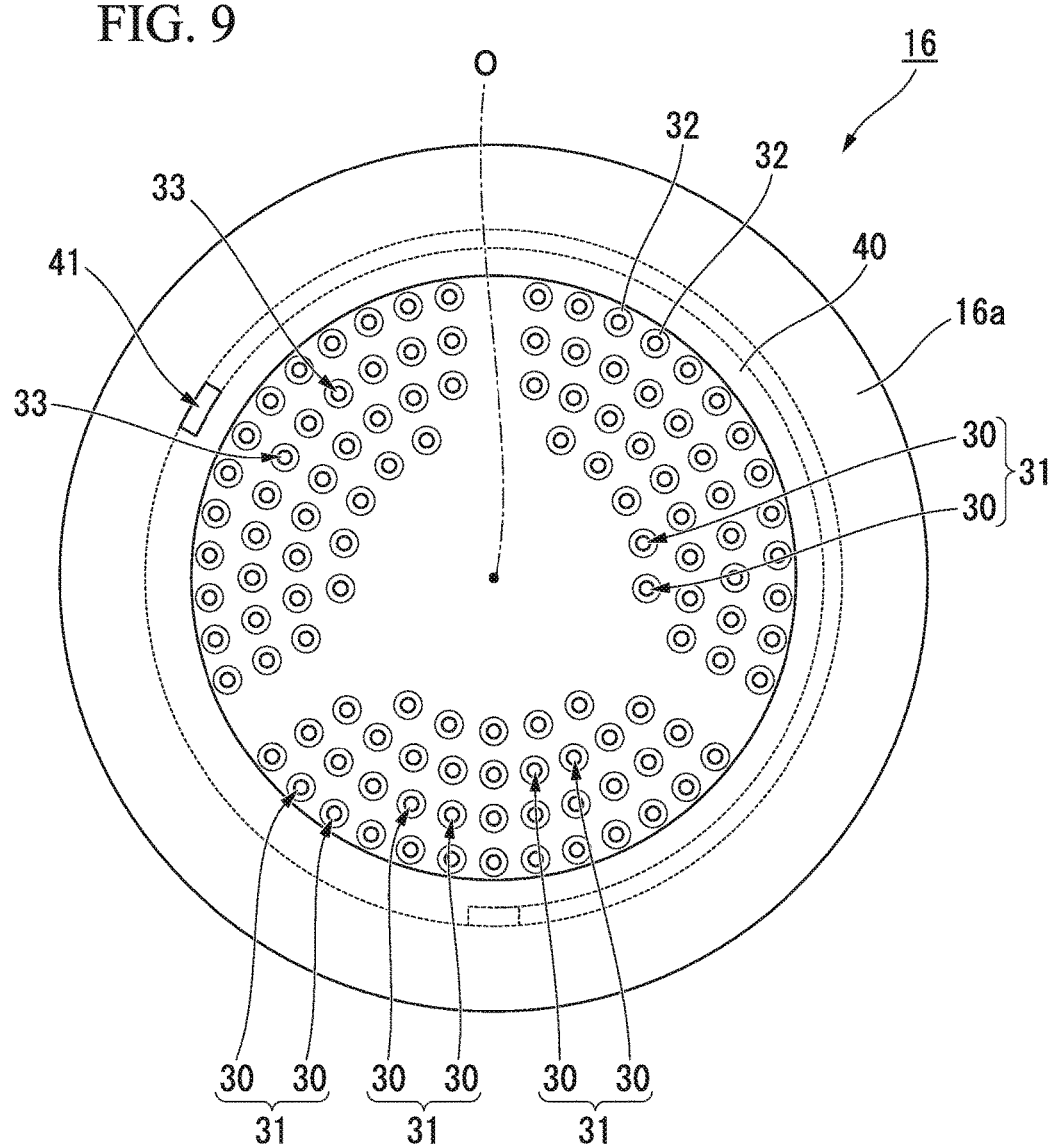
FIG. 9 is a plan view showing a partition member constituting the vibration-damping device shown in FIG. 8.

As shown in FIGS. 8 and 9, in the vibration-damping device 60 of this embodiment, a partition member 16 is provided with a plurality of passage rows 31. The plurality of passage rows 31 are provided on a plurality of circumferences with different diameters about the axis O. In other words, the partition member 16 is provided with the plurality of passage rows 31 in a multiple manner in the radial direction.

Figure 10:
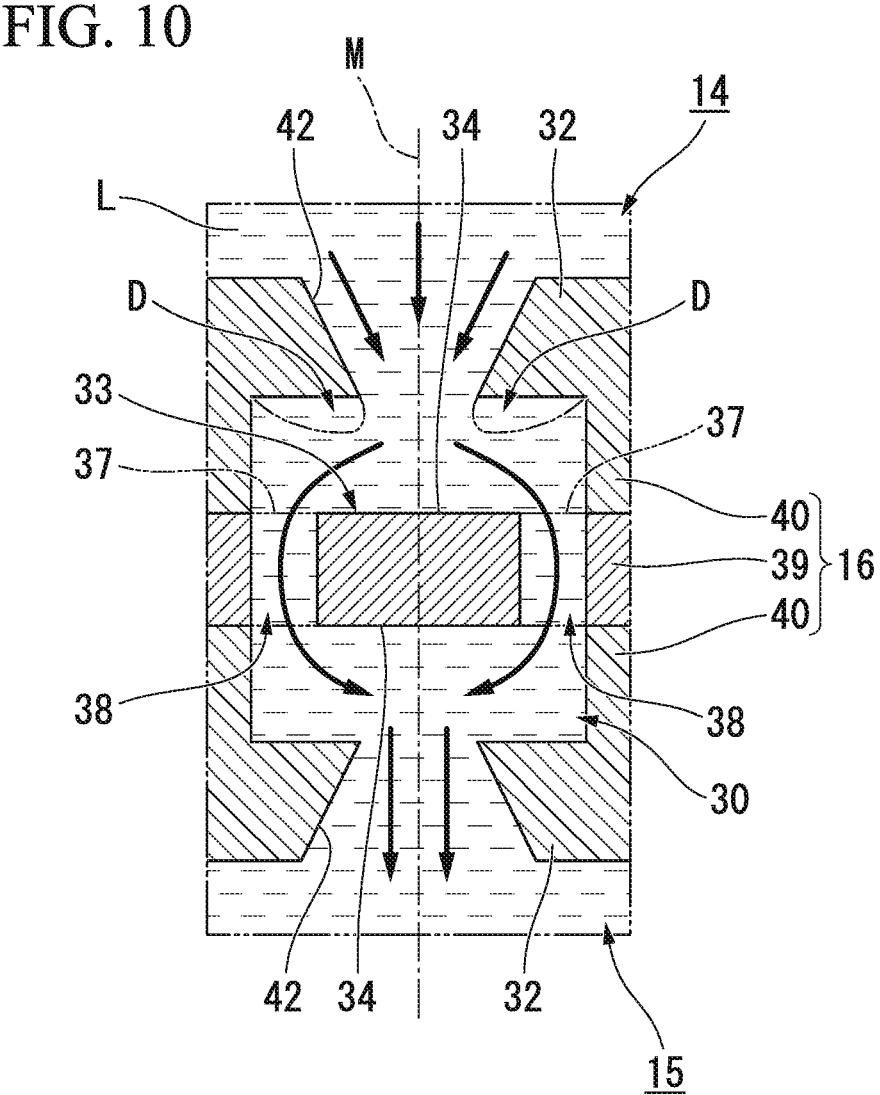
FIG. 10 is a longitudinal cross-sectional view showing a major part of the partition member shown in FIG. 9.

As shown in FIG. 10, in each of the communicating passages 30, an inner circumferential surface of a throttling section 32 is gradually reduced in diameter toward a branching body 33 from one side or the other side in the axial O direction. Also, The outer diameter of the branching body 33 is greater than an inner diameter of an end of the throttling section 32 which is close to the branching body 33 in the axial O direction and is the same over the entire length in the axial O direction. The width of the branching body 33 in the axial O direction is the same as a width of a bridge section 37.

In the vibration-damping device 60, when the vibrations in the axial O direction are input from the vibration generating unit and the liquid L flows into the communicating passage 30 via an inside of the throttling section 32, a flow of the liquid L which reaches a portion in the communicating passage 30 at which the branching body 33 is located and flows in the communicating passage 30 is branched outward in the flow passage radial direction. At this time, for example, it is difficult for the liquid L to inflow into a region D adjacent to an end of the communicating passage 30, which is close to the branching body 33 in the axial O direction of the throttling section 32, in the axial O direction, and the flow thereof is thus divided. Thus, an effective cross-sectional area is reduced in the communicating passage 30, thereby increasing the pressure loss of the liquid L. After that, flows of the liquid L which is branched by the branching body 33 are joined by the throttling section 32 such that directions of the flows face each other and the flows of the liquid L collide with each other, thereby further increasing the pressure loss of the liquid L.

(Fifth Embodiment)

Next, a vibration-damping device related to a fifth embodiment of the present invention will be described with reference to FIG. 11.

Note that, in the fifth embodiment, the same elements as those in the fourth embodiment are denoted by the same reference numerals, overlapping descriptions will be omitted, and only differences thereof will be described.

Figure 11:
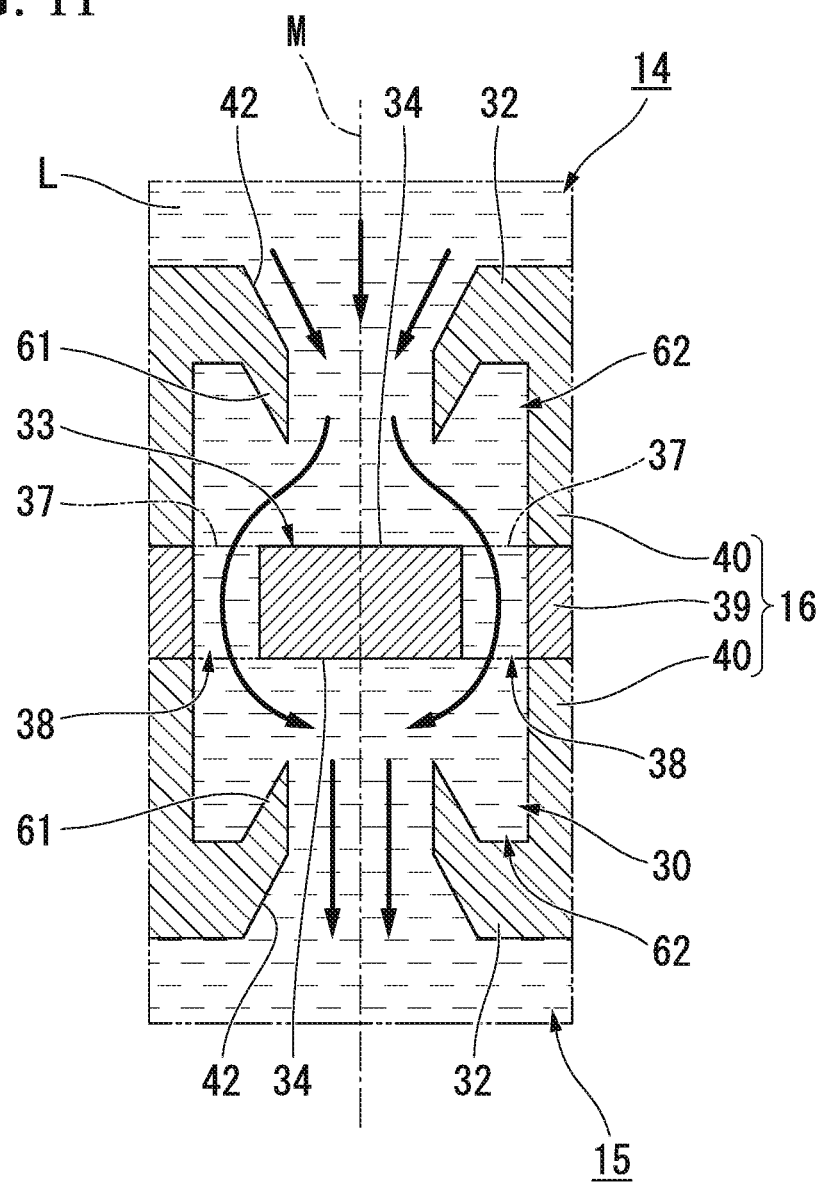
FIG. 11 is a longitudinal cross-sectional view showing a major part of a partition member included in a vibration-damping device related to a fifth embodiment of the present invention.

As shown in FIG. 11, in the vibration-damping device of this embodiment, throttling sections 32 are provided with protruding cylinders 61 which protrude inward in the axial O direction. The protruding cylinders 61 are provided at the pair of throttling sections 32 and are disposed coaxially with the flow passage axis M. An inner diameter of each of the protruding cylinders 61 is set to be equal over the entire length in the axial O direction, and an outer diameter of the protruding cylinder 61 is gradually reduced in diameter toward a branching body 33 in the axial O direction.

The protruding cylinder 61 is provided at an inner circumferential edge section of a throttling section 32, and annular space sections 62 which are open toward the branching body 33 in the axial O direction are provided between an outer circumferential surface of the protruding cylinder 61 and an inner circumferential surface of an intermediate section of a communicating passage 30 in the axial O direction. An inner diameter of each of the space sections 62 (in other words, the outer diameter of the protruding cylinder 61) is gradually reduced in diameter toward the branching body 33 in the axial O direction.

(Sixth Embodiment)

Next, a vibration-damping device related to a sixth embodiment of the present invention will be described with reference to FIGS. 12 and 13.

Note that, in the sixth embodiment, the same elements as those in the fourth embodiment are denoted by the same reference numerals, overlapping descriptions will be omitted, and only differences thereof will be described.

Figure 12:
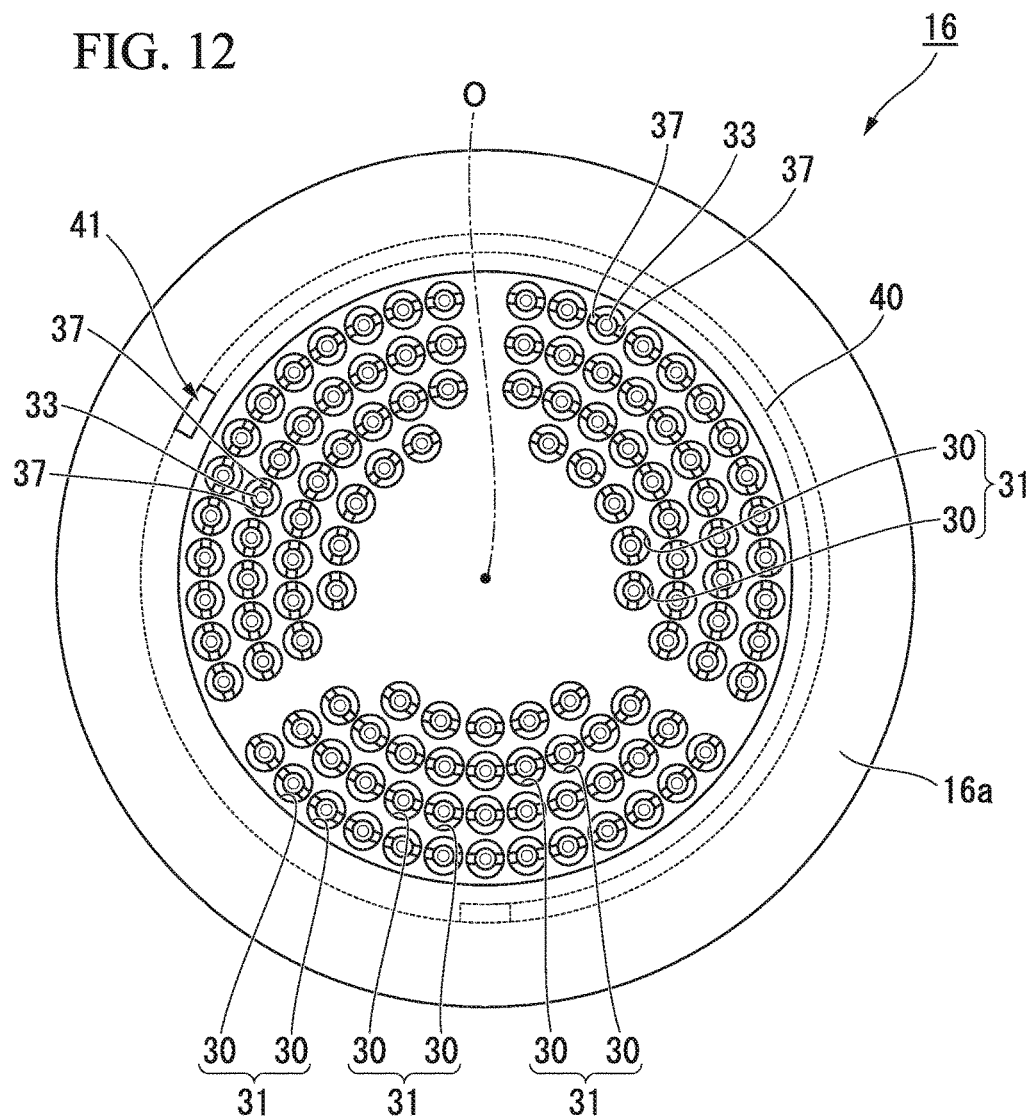
FIG. 12 is a plan view of a partition member included in a vibration-damping device related to a sixth embodiment of the present invention.
Figure 13:
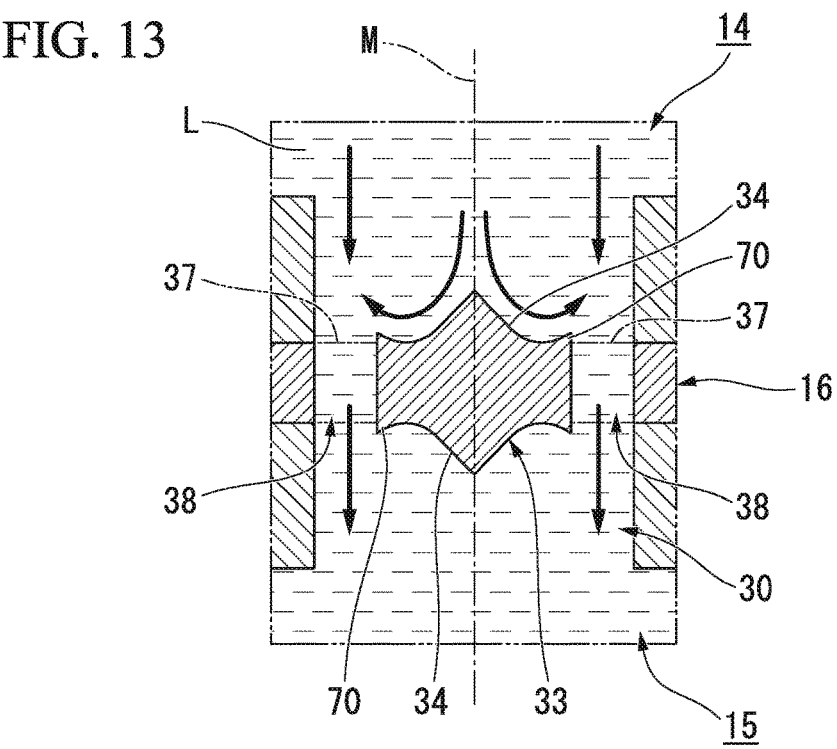
FIG. 13 is a longitudinal cross-sectional view showing a major part of the partition member shown in FIG. 12.

As shown in FIGS. 12 and 13, in the vibration-damping device of this embodiment, communicating passages 30 are formed in the same diameter over the entire length in the axial O direction instead of the throttling section 32 installed at the communicating passages 30. Also, in the plurality of communicating passages 30 which constitute the same passage rows 31, a bridge section 37 disposed inside each of the communicating passages 30 extends along a circumference which passes through the communicating passage 30.

As shown in FIG. 13, a pair of end surfaces 34 of a branching body 33 which faces the one side and the other side in the axial O direction are conical surfaces which are convex toward the one side and the other side in the axial O direction from a central portion of the branching body in the axial O direction. In the illustrated example, each of the end surfaces 34 of the branching body 33 forms a circular conical surface about the flow passage axis M. The branching body 33 flows the liquid L on each of the end surfaces 34 of the branching body 33 outward in the flow passage radial direction so that a flow of the liquid L is branched.

In this embodiment, the branching body 33 is provided with a returning section (a second confluence section) 70. The returning section 70 joins at least a portion of the flows of the liquid L which is branched by the branching body 33 to a flow of another portion of the liquid L inside the communicating passage 30 which flows along the inner circumferential surface of the communicating passage 30. In other words, the returning section 70 returns directions of the flows of the liquid L, which is directed toward the outside in the flow passage radial direction on the branching body 33, in the axial O direction and joins the flows to the flow of the other portion of the liquid L.

The returning section 70 is provided at an outer circumferential edge section having an outer circumferential edge of the end surface 34 of the branching body 33. The outer circumferential edge section is directed from the inside in the flow passage radial direction toward the outside and is formed to gradually overhang toward the one side and the other side in the axial O direction from the central portion of the branching body 33 in the axial O direction. In other words, the end surface 34 of the branching body 33 is formed such that the outer circumferential edge section constituting the returning section 70 and a portion which is further inward in the flow passage radial direction (a portion formed by the circular conical surface which does not constitute the returning section 70) than the outer circumferential edge section are adjacent to each other in the flow passage radial direction. In the illustrated example, a portion of the end surface 34 of the branching body 33 which is between the flow passage axis M and the outer circumferential edge is formed in one concave curved shape which is concave toward the central portion of the branching body 33 in the axial O direction in a longitudinal cross-sectional view of the branching body 33 in the axial O direction and the flow passage radial direction. The returning section 70 is provided throughout the circumference of the branching body 33 in the flow passage circumferential direction.

When the vibrations in the axial O direction are input to the vibration-damping device from the vibration generating unit, and for example, the liquid L in the main liquid chamber 14 is caused to flow toward the subsidiary liquid chamber 15 via the communicating passage 30, as shown in FIG. 13, the liquid L flows into the communicating passage 30 from an end of the communicating passage 30 on the one side and reaches a portion of the communicating passage 30 at which the branching body 33 is located.

At this time, the liquid L flowing along the outside in the flow passage radial direction inside the communicating passage 30 among the liquid L flowing through the communicating passage 30 flows toward the passage gaps 38 along the inner circumferential surface of the communicating passage 30. Also, the liquid L flowing along the inside in the flow passage radial direction inside the communicating passage 30 flows on the end surface 34 of the branching body 33 outward in the flow passage radial direction. At this time, a direction of the flow of the liquid L flowing along the inside in the flow passage radial direction inside the communicating passage 30 is reversed by the returning section 70 in the axial O direction. Because of this, the flow of the liquid L flowing along the inside in the flow passage radial direction inside the communicating passage is joined to the flow of another portion of the liquid L flowing toward the above-described passage gaps 38.

Therefore, when normal vibrations such as idle vibrations and shake vibrations are input to the vibration-damping device and a flow velocity of the liquid L flowing through the communicating passage 30 is thus increased, pressure loss of the liquid L is increased due to, for example, energy loss occurring when the flows of the liquid L that are caused to be joined collide with each other.

As described above, according to the vibration-damping device related to this embodiment, since the returning section 70 is provided in the branching body 33, for example, a structure of the vibration-damping device can be simplified.

Also, the returning section 70 joins the flow of the liquid L on the branching body 33 to the flow of the other portion of the liquid L flowing toward the passage gaps 38 along the inner circumferential surface of the communicating passage 30 among the liquid L flowing in the communicating passage 30. Therefore, the branching body 33 branches the liquid L having a relatively high flow velocity which flows in the communicating passage 30 along the flow passage axis M so that the liquid L having the relatively high flow velocity can collide with another portion of the liquid L having a relatively low flow velocity which flows along the inner circumferential surface of the communicating passage 30 inside the communicating passage 30. Thus, the pressure loss of the liquid L can be effectively increased.

(Seventh Embodiment)

Next, a vibration-damping device related to a seventh embodiment of the present invention will be described with reference to FIGS. 14 to 16.

Note that, in the seventh embodiment, the same elements as those in the first embodiment are denoted by the same reference numerals, overlapping descriptions will be omitted, and only differences thereof will be described.

Figure 14:
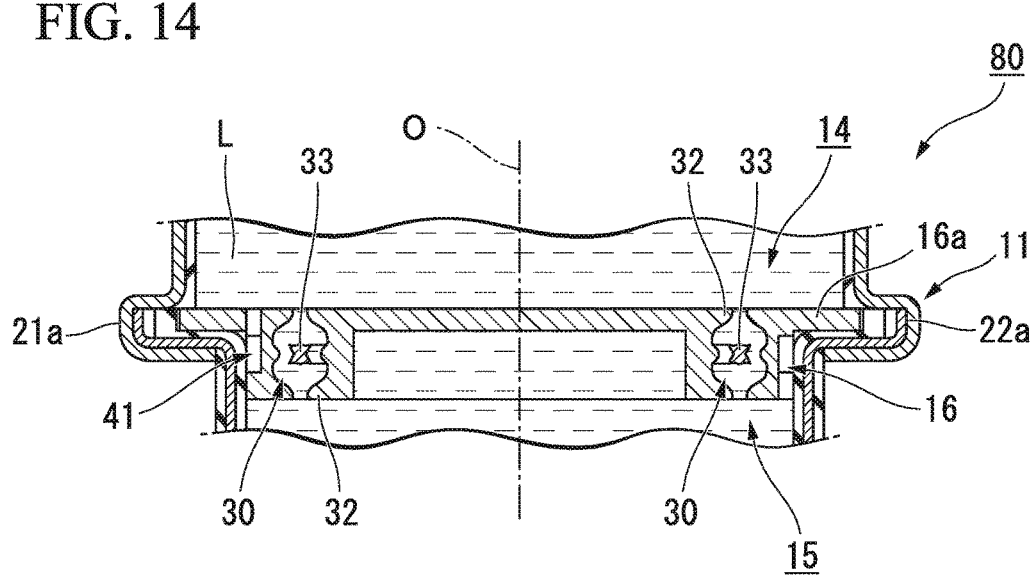
FIG. 14 is a longitudinal cross-sectional view of a portion near a partition member in a vibration-damping device related to a seventh embodiment of the present invention.
Figure 15:
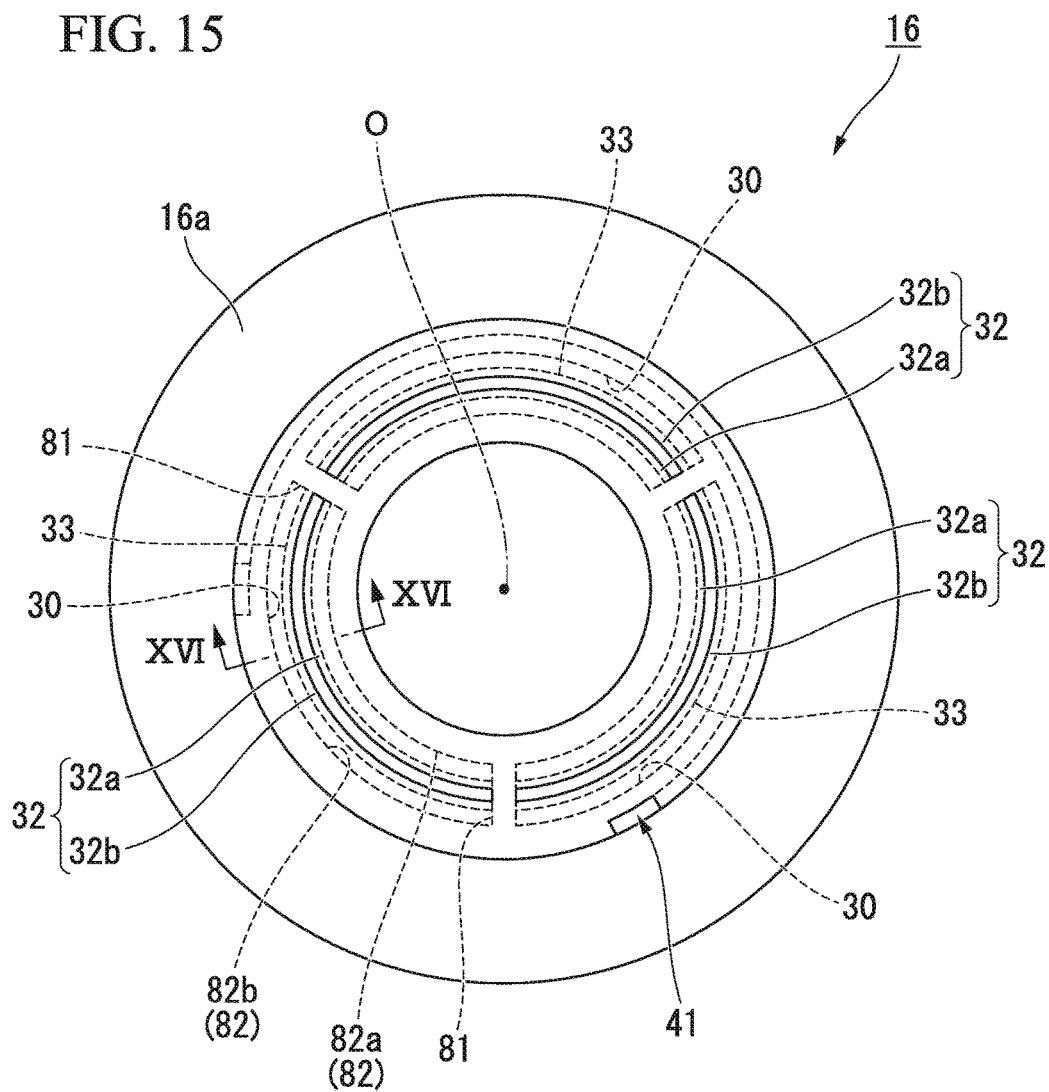
FIG. 15 is a bottom view showing a partition member constituting the vibration-damping device shown in FIG. 14.

As shown in FIGS. 14 and 15, in the vibration-damping device 80 of this embodiment, a communicating passage 30 is formed in a rectangular shape which extends in a circumferential direction instead of the circular shape which is formed in a planar view of a partition member 16 viewed in the axial O direction. The communicating passage 30 is curved in the radial direction (the surrounding direction) while extending in the circumferential direction and is convex outward in the radial direction in the planar view.

An inner circumferential surface of the communicating passage 30 includes a pair of small wall surfaces 81 which face in a circumferential direction and a pair of large wall surfaces 82 which face in the radial direction. The large wall surfaces 82 face each other in the radial direction and include inner large wall surfaces 82a which are at the inside in the radial direction and outer large wall surfaces 82b which are at the outside in the radial direction.

In this embodiment, throttling sections 32 protrude from the pair of large wall surfaces 82 in the radial direction instead of the throttling section 32 which annularly protrudes from the inner circumferential surface of the communicating passage 30. The throttling sections 32 are each provided over the entire length in a circumferential direction of the large wall surfaces 82, and both ends of the throttling section 32 in the circumferential direction are joined to the small wall surfaces 81.

The throttling section 32 includes an inner throttling section 32a which protrudes outward in the radial direction from each of the inner large wall surfaces 82a and an outer throttling section 32b which protrudes inward in the radial direction from each of the outer large wall surfaces 82b. As shown in FIG. 16, the inner throttling section 32a overhangs in the axial O direction toward a central portion of the partition member 16 in the axial O direction gradually inward from the outside in the radial direction, and the outer throttling section 32b overhangs in the axial O direction toward the central portion of the partition member 16 in the axial O direction gradually outward from the inside in the radial direction. A surface of the throttling section 32 which faces the central portion of the partition member 16 in the axial O direction is inclined with respect to the flow passage axis M in longitudinal cross-sectional views of the communicating passage 30 in both directions of the axial O direction and the radial direction.

The central portion in the axial O direction of the inner circumferential surface of the communicating passage 30 is provided with protruding sections 83 which protrude in the radial direction. Each of the protruding sections 83 is provided at a central portion of each of the large wall surfaces 82 in the axial O direction and is accommodated in an intermediate section of the communicating passage 30 in the axial O direction. The protruding section 83 is formed as a protrusion which extends in the circumferential direction, and both ends of the protruding section 83 in the circumferential direction are joined to the small wall surfaces 81. The protruding section 83 is formed in a convex curved shape which is convex in the radial direction in the longitudinal cross-sectional view.

As shown in FIG. 15, a branching body 33 is formed in a rod shape which extends in the circumferential direction.

The branching body 33 extends in the circumferential direction, is curved in the radial direction, and is convex outward in the radial direction in the planar view. Both ends of the branching body 33 in the circumferential direction are joined to the pair of small wall surfaces 81.

Figure 16:
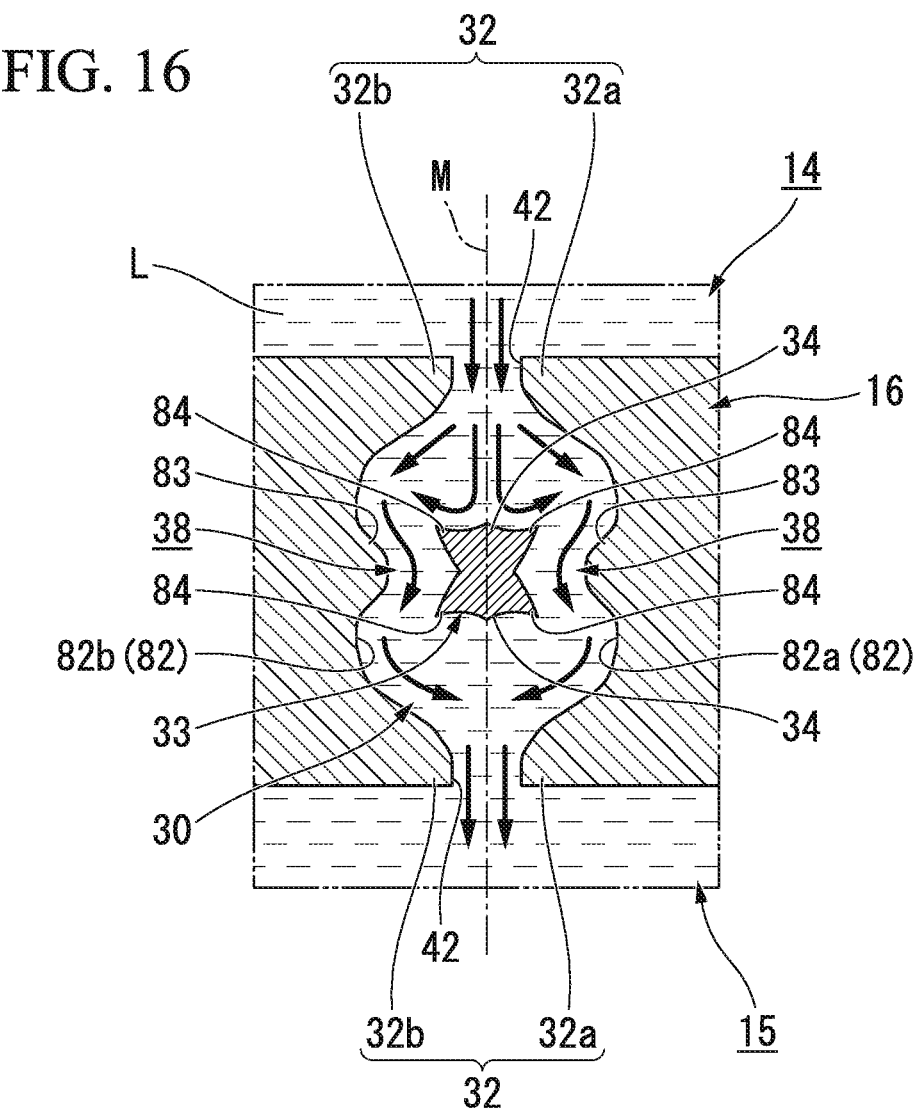
FIG. 16 is a longitudinal cross-sectional view (a cross-sectional view taken along a line XVI-XVI) showing a major part of the partition member shown in FIG. 15.

As shown in FIG. 16, a pair of end surfaces 34 of the branching body 33 which face the one side and the other side in the axial O direction gradually extend toward the one side and the other side in the axial O direction from a central portion of the branching body 33 in the axial O direction as they go toward both ends in the radial direction from a center of the branching body 33 in the radial direction. The width of the branching body 33 in the radial direction becomes smaller from both ends in the radial direction toward the central portion of the branching body 33 in the axial O direction from the one side and the other side in the axial O direction.

The passage gaps 38 through which the liquid L passes in the axial O direction are provided between the inner circumferential surface of the communicating passage 30 and an outer circumferential surface of the branching body 33 to surround the branching body 33. The pair of passage gaps 38 are provided to surround the branching body 33 in the radial direction. The width of the passage gaps 38 in the radial direction is equal over the entire length in the axial O direction, and a flow passage cross-sectional area of the passage gaps 38 is also similarly equal over the entire length in the axial O direction.

The branching body 33 is provided with returning sections (second confluence sections) 84. The returning sections 84 reverse directions of flows of the liquid L which is branched by the branching body 33 in the axial O direction and join the flows to the flow of another portion of the liquid L. The returning sections 84 are provided at both ends of the branching body 33 in the radial direction and join the flow of the liquid L flowing on the branching body 33 to the flows of the liquid L flowing toward the passage gaps 38 along the inner circumferential surface of the communicating passage 30 among the liquid L flowing in the communicating passage 30.

Both ends in the radial direction of the end surfaces 34 of the branching body 33 overhang outward in the axial O direction, and the returning sections 84 are formed in a concave curved shape which is concave toward the central portion of the branching body 33 in the axial O direction in the longitudinal cross-sectional view. The returning sections 84 are provided at both ends in the radial direction of the end surface 34 of the branching body 33 over the entire length in the circumferential direction.

When the vibrations in the axial O direction are input to the vibration-damping device 80 from the vibration generating unit, and for example, the liquid L in the main liquid chamber 14 is caused to flow toward the subsidiary liquid chamber 15 via the communicating passage 30, as shown in FIG. 16, the liquid L flows into the communicating passage 30 from the throttling section 32 of one side of the communicating passage 30. After that, a portion of the liquid L spreads inside the communicating passage 30 to both sides of the flow passage axis M in the radial direction and flows toward the passage gaps 38 along the large wall surfaces 82 of the inner circumferential surface of the communicating passage 30.

Also, the flow of the liquid L flowing in the axial O direction toward the branching body 33 among the liquid L flowing into the communicating passage 30 is branched by the branching body 33 toward both sides in the radial direction about the branching body 33. At this time, the liquid L flows on the end surfaces 34 of the branching body 33 so that the returning section 84 reverses a direction of the flow of the liquid L in the axial O direction. Thus, the reversed flow of the liquid L is joined to the flow of the liquid L flowing toward the above-described passage gaps 38.

Therefore, when normal vibrations such as idle vibrations and shake vibrations are input to the vibration-damping device 80, and a flow velocity of the liquid L flowing through the communicating passage 30 is increased, pressure loss of the liquid L is increased due to, for example, energy loss occurring when the flows of the liquid L that are joined by the returning sections 84 collide with each other or the like.

(Eighth Embodiment)

Next, a vibration-damping device related to an eighth embodiment of the present invention will be described with reference to FIG. 17.

Note that, in the eighth embodiment, the same elements as those in the third embodiment are denoted by the same reference numerals, overlapping descriptions will be omitted, and only differences thereof will be described.

Figure 17:
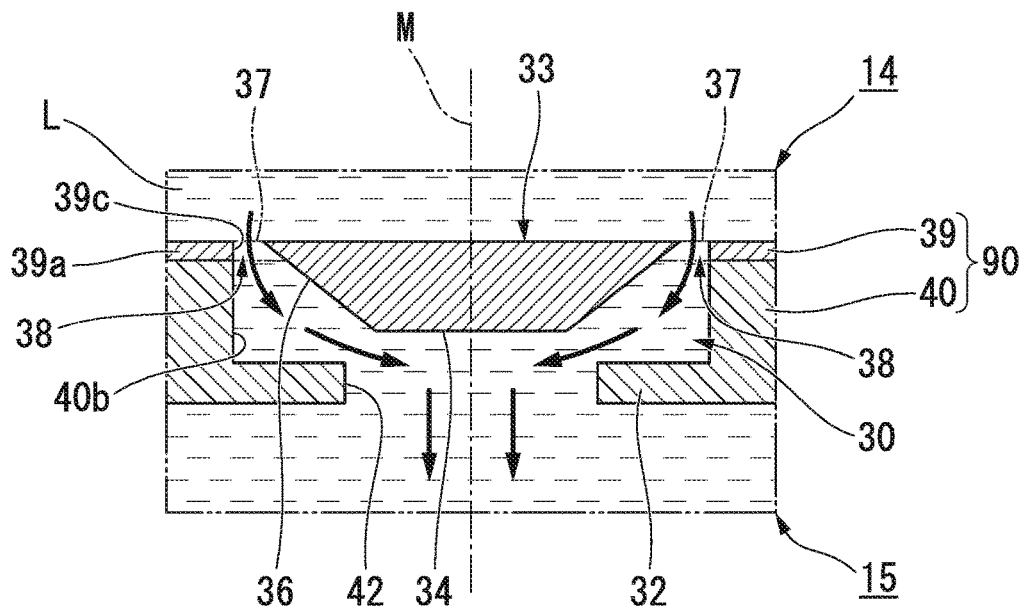
FIG. 17 is a longitudinal cross-sectional view showing a major part of a partition member included in a vibration-damping device related to an eighth embodiment of the present invention.

As shown in FIG. 17, in the vibration-damping device of this embodiment, a member on the other side of members obtained by dividing the partition member 16 in the third embodiment into two parts in the axial O direction is adopted as a partition member 90. In other words, the partition member 90 includes a portion of the central dividing body 39 and the outer dividing body 40 on the other side among the three dividing bodies constituting the partition member 16 in the third embodiment.

Thus, a branching body 33 is exposed to one of the main liquid chamber 14 and the subsidiary liquid chamber 15, and the passage gaps 38 of the central dividing body 39 are open to one of the liquid chambers. Also, flow passage forming holes 40b of the outer dividing body 40 connect the plurality of passage gaps 38 as a single body and are in communication with the other of the main liquid chamber 14 and the subsidiary liquid chamber 15, and the plurality of passage gaps 38. In the illustrated example, the branching body 33 is exposed to the main liquid chamber 14, and the passage gaps 38 of the central dividing body 39 are open to the main liquid chamber 14. Also, the flow passage forming holes 40b of the outer dividing bodies 40 connect the plurality of passage gaps 38 as the single body and are in communication with the subsidiary liquid chamber 15 and the plurality of passage gaps 38.

In the vibration-damping device, when the vibrations in the axial O direction are input from the vibration generating unit, the liquid L in the main liquid chamber 14 is branched by the branching body 33 and flows into the communicating passage 30 via the plurality of passage gaps 38. As a result, after the flow of the liquid L, which flows into the communicating passage 30 from the main liquid chamber 14, flows into the communicating passage 30, the liquid L is branched. After that, the flows of the liquid L which is branched by the branching body 33 are joined by the throttling section 32 such that directions of the flows face each other and the flows of the liquid L collide with each other, thereby increasing the pressure loss of the liquid L.

( Ninth Embodiment)

Next, a vibration-damping device related to a ninth embodiment of the present invention will be described with reference to FIG. 18.

Note that, in the ninth embodiment, the same elements as those in the eighth embodiment are denoted by the same reference numerals, overlapping descriptions will be omitted, and only differences thereof will be described.

Figure 18:
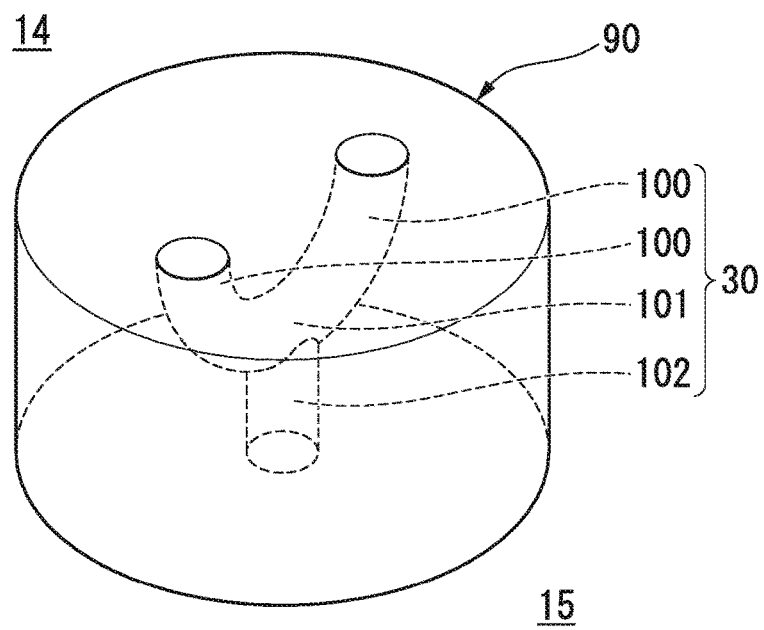
FIG. 18 is a schematic perspective view of a partition member included in a vibration-damping device related to a ninth embodiment of the present invention.

As shown in FIG. 18, in the vibration-damping device of this embodiment, a communicating passage 30 includes branching passages (branching sections) 100, a connecting space (a first confluence section) 101, and an extension passage 102.

The branching passages 100 branch a flow of the liquid L which flows between the main liquid chamber 14 and the subsidiary liquid chamber 15 via the communicating passage 30. In the communicating passage 30, the plurality of branching passages 100 are provided independently of each other. The plurality of branching passages 100 are open to one of the main liquid chamber 14 and the subsidiary liquid chamber 15. In the illustrated example, the two branching passages 100 are provided in one communicating passage 30 and are open to the main liquid chamber 14. The two branching passages 100 in the communicating passage 30 are close to each other toward the subsidiary liquid chamber 15 from the main liquid chamber 14 in a passage axial direction.

The connecting space 101 joins the flows of the liquid L which is branched by the plurality of branching passages 100 to each other. The connecting space 101 connects ends of the plurality of branching passages 100 in the passage axial direction as a single body. In the illustrated example, the connecting space 101 connects ends of the two branching passages 100 which are at the subsidiary liquid chamber 15 side in the passage axial direction as a single body. The connecting space 101 is in communication with the other of the main liquid chamber 14 and the subsidiary liquid chamber 15, and the plurality of branching passages 100. In the illustrated example, the extension passage 102 extends toward the other side from the connecting space 101 and is in communication with the connecting space 101 and the subsidiary liquid chamber 15.

In the vibration-damping device, when the vibrations in the axial O direction are input from the vibration generating unit, the liquid L in the main liquid chamber 14 flows into the communicating passage 30 via the plurality of branching passages 100. As a result, after the flow of the liquid L, which flows into the communicating passage 30 from the main liquid chamber 14, flows into the communicating passage 30, the liquid L is branched. After that, the flows of the liquid L which is branched by the branching passages 100 are joined in the connecting space 101 such that directions of the flows face each other and the flows of the liquid L collide with each other, thereby increasing pressure loss of the liquid L.

As described above, according to the vibration-damping device related to this embodiment, the connecting space 101 connects the ends of the plurality of branching passages 100 as the sing body in the passage axial direction. The flows of the liquid L which flow through the plurality of branching passages 100 independently of each other can be joined in the connecting space 101. Thus, the flows of the liquid L can reliably collide with each other in the connecting space 101, and pressure loss of the liquid L can be more effectively increased.

Note that the technical scope of the present invention is not limited to this embodiment and can be modified in various ways without departing from the gist of the present invention.

In the present invention, one communicating passage 30 may be provided rather than the plurality of communicating passages 30.

Also, in the above-described embodiments, the main liquid chamber 14 and the subsidiary liquid chamber 15 communicate with each other through the restricting passage 41 different from the communicating passage 30 in addition to the communicating passage 30 but the present invention is not limited thereto. For example, the main liquid chamber and the subsidiary liquid chamber may communicate with each other only through the communicating passage rather than the restricting passage 41.

In the present invention, a confluence section of another form may be provided instead of the throttling section 32, the returning sections 70 and 84, and the connecting space 101. In other words, the confluence section may be appropriately changed to another constitution which joins at least a portion of flows of a liquid which is branched by the branching section to a flow of another portion of the liquid flowing in a communicating passage.

In the embodiments, insides of the restricting passage 41, the passages 42, the branching passages 100, and the extension passage 102 may be closed by a film body, such as, for example, an elastic thin film, which is elastically deformed due to a liquid pressure of the liquid L. Even in this case, a liquid pressure of the liquid L at both sides surrounding the film body is transferred via the film body so that the liquid L flows through the liquid L flows through the insides of the restricting passage 41, the passages 42, the branching passages 100, and the extension passage 102.

The partition member 16 partitions the liquid chamber in the first attachment member 11 into the main liquid chamber 14 having the elastic body 13 as the portion of the wall surface thereof and the subsidiary liquid chamber 15 in the embodiments, but the present invention is not limited thereto. For example, a pair of elastic bodies may be provided in an axial direction instead of the provided diaphragm, a subsidiary liquid chamber may not be provided, and a pressure receiving liquid chamber having an elastic body as a portion of a wall surface thereof may be provided. In other words, the partition may be appropriately changed to another constitution in which the partition member partitions the liquid chamber in the first attachment member in which the liquid is sealed into the first liquid chamber and the second liquid chamber, and at least one of the first liquid chamber and the second liquid chamber has the elastic body as a portion of a wall surface thereof.

The case in which the engine is connected to the second attachment member 12 and the first attachment member 11 is connected to the vehicle body has been described in the embodiments, but the vehicle may be connected to the second attachment member 12 and the first attachment member 11 may be connected to the engine.

The vibration-damping device 10 according to the present invention is not limited to an engine mount of the vehicle and can also be applied to components other than the engine mount. For example, the vibration-damping device can also be applied to mounts of electric generators mounted in construction machines or can also be applied to mounts of machines installed at factories, etc.

In addition, the constituent elements of the above-described embodiments can be appropriately replaced with well-known constituent elements without departing from the spirit of the present invention, and appropriately combined with the modified examples described above.

INDUSTRIAL APPLICABILITY

According to the present invention, simplification of a structure and facilitation of manufacture can be achieved while product features are secured.

REFERENCE SIGNS LIST 10, 60, 80 vibration-damping device
11 first attachment member
12 second attachment member
13 elastic body
14 main liquid chamber (first liquid chamber)
15 subsidiary liquid chamber (second liquid chamber)
16, 90 partition member
30 communicating passage
32 throttling section (first confluence sections)
33 branching body (branching section)
38 passage gap
41 restricting passage
50 turning section
70, 84 returning section (second confluence section)
100 branching passage (branching section)
101 connecting space (first confluence section)
L liquid
M flow passage axis
A projecting end surface
B edge
C top surface
D region

The invention claimed is:

1. A vibration-damping device in which at least one of a first liquid chamber and a second liquid chamber has an elastic body as a portion of a wall surface, the vibration-damping device comprising:
   a tubular first attachment member joined to one of a vibration generating unit and a vibration receiving unit;
   a second attachment member joined to an other of the vibration generating unit and the vibration receiving unit;
   an elastic body which joins the first attachment member to the second attachment member; and
   a partition member which partitions a liquid chamber in the first attachment member in which a liquid is sealed into a first liquid chamber and a second liquid chamber,
   wherein the partition member is provided with a communicating passage through which the first liquid chamber communicates with the second liquid chamber,
   the communicating passage is provided with a branching section which branches a flow of the liquid flowing between the first liquid chamber and the second liquid chamber via the communicating passage and a confluence section which joins at least a portion of flows of the liquid which is branched by the branching section to a flow of another portion of the liquid flowing in the communicating passage,
   a branching body disposed in the communicating passage is provided as the branching section, and
   the branching body is formed as a rigid body with sufficient rigidity that the branching body is not deformed when the branching body receives the flow of the liquid.

2. The vibration-damping device according to claim 1, wherein
   first confluence sections which join the flows of the liquid which is branched by the branching section to each other is provided as the confluence section.

3. The vibration-damping device according to claim 2, wherein
   a passage gap through which the liquid passes in a passage axial direction of the communicating passage is provided between an outer circumferential surface of the branching body and an inner circumferential surface of the communicating passage to surround the branching body, and
   the first confluence sections protrude from positions of the inner circumferential surface of the communicating passage which are shifted with respect to the branching body in the passage axial direction thereof and change the flows of the liquid which is branched by the branching body and passes through the passage gap inward in a surrounding direction in which the passage gap surrounds the branching body.

4. The vibration-damping device according to claim 2, wherein
   a plurality of branching passages which constitute the communicating passage and are provided independently of each other as the branching section, and
   the first confluence sections connect ends of the plurality of branching passages in a passage axial direction as a single body.

5. The vibration-damping device according to claim 1, wherein
   a second confluence section which is provided at the branching section, reverses directions of the flows of the liquid which is branched by the branching section in a flow passage axial direction of the communicating passage, and joins the flows of the liquid to a flow of another portion of the liquid is provided as the confluence section.

6. The vibration-damping device according to claim 5, wherein
   a branching body disposed in the communicating passage is provided as the branching section,
   a passage gap through which the liquid passes in a passage axial direction of the communicating passage is provided between an outer circumferential surface of the branching body and an inner circumferential surface of the communicating passage to surround the branching body,
   the branching body flows the liquid on the branching body outward in a surrounding direction in which the passage gap surrounds the branching body to branch a flow of the liquid, and
   the second confluence section is provided at an end of the branching body of an outside in the surrounding direction and joins a flow of the liquid flowing on the branching body to a flow of the liquid flowing toward the passage gap along an inner circumferential surface of the communicating passage among the liquid flowing in the communicating passage.

7. The vibration-damping device according to claim 1, wherein
   a branching body disposed in the communicating passage is provided as the branching section,
   the branching body is disposed on a flow passage axis of the communicating passage.

8. The vibration-damping device according to claim 7, wherein
   the branching body is provided with a turning section which directs the liquid flowing on the branching body toward an outside in a radial direction of the communicating passage and turns the liquid in a flow passage circumferential direction about the flow passage axis.

9. The vibration-damping device according to claim 1, wherein
the plurality of communicating passages are provided in the partition member in a circumferential direction of the partition member and pass through the partition member in an axial direction of the partition member.

10. The vibration-damping device according to claim 1, wherein
the partition member is provided with a restricting passage which is provided independently from the communicating passage and in which the first liquid chamber communicates with the second liquid chamber.

11. The vibration-damping device according to claim 1, wherein the branching body is integrally formed with the partition member.

* * * * *